US010627687B2

(12) United States Patent
Kim

(10) Patent No.: US 10,627,687 B2
(45) Date of Patent: Apr. 21, 2020

(54) LIQUID CRYSTAL DISPLAY DEVICE

(71) Applicant: SAMSUNG DISPLAY CO., LTD., Yongin-si, Gyeonggi-do (KR)

(72) Inventor: Keunwoo Kim, Yongin-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 0 days.

(21) Appl. No.: 16/353,214

(22) Filed: Mar. 14, 2019

(65) Prior Publication Data
US 2019/0204696 A1 Jul. 4, 2019

Related U.S. Application Data

(62) Division of application No. 15/225,007, filed on Aug. 1, 2016, now Pat. No. 10,234,736.

(30) Foreign Application Priority Data

Nov. 18, 2015 (KR) ........................ 10-2015-0161496

(51) Int. Cl.
*G02F 1/1362* (2006.01)
*G09G 3/36* (2006.01)
(Continued)

(52) U.S. Cl.
CPC ...... *G02F 1/136213* (2013.01); *G02F 1/1368* (2013.01); *G02F 1/13624* (2013.01); *G02F 1/134309* (2013.01); *G02F 1/136286* (2013.01); *G09G 3/3648* (2013.01); *G02F 2001/134345* (2013.01); *G09G 3/3614* (2013.01);
(Continued)

(58) Field of Classification Search
CPC ................................. G02F 1/136213
See application file for complete search history.

(56) References Cited

U.S. PATENT DOCUMENTS 8,330,888 B2    12/2012   Kim
8,355,090 B2    1/2013    Kwon et al.
(Continued)

FOREIGN PATENT DOCUMENTS

KR    10-2010-0068051 A    6/2010
KR    10-2010-0092738 A    8/2010
(Continued)

*Primary Examiner* — Sang V Nguyen
(74) *Attorney, Agent, or Firm* — Kile Park Reed & Houtteman PLLC

(57) ABSTRACT

A liquid crystal display device includes at least one pixel that includes first, second, third, and fourth switches connected to at least one gate line and at least one data line, a first sub-pixel electrode connected to the first switch, a second sub-pixel electrode connected to the second switch, a third sub-pixel electrode connected to the third switch, a fourth sub-pixel electrode connected to the fourth switch, a first capacitor connected between a gate electrode and a source electrode of the first switch, a second capacitor connected between a gate electrode and a source electrode of the second switch, a third capacitor connected between a gate electrode and a source electrode of the third switch, and a fourth capacitor connected between a gate electrode and a source electrode of the fourth switch. At least two of the first, second, third, and fourth capacitors have different capacitance values from one another.

13 Claims, 14 Drawing Sheets

(51) Int. Cl.
  *G02F 1/1343* (2006.01)
  *G02F 1/1368* (2006.01)
(52) U.S. Cl.
  CPC ............... *G09G 2300/0426* (2013.01); *G09G 2300/0443* (2013.01); *G09G 2310/0205* (2013.01)

(56) References Cited

U.S. PATENT DOCUMENTS

| | | | | |
|---|---|---|---|---|
| 2002/0070905 A1* | 6/2002 | Kodate | ................ | G09G 3/3659 345/55 |
| 2005/0243045 A1* | 11/2005 | Kim | ..................... | G09G 3/3659 345/87 |
| 2010/0149157 A1* | 6/2010 | Shih | ..................... | G02F 1/13624 345/211 |
| 2010/0156954 A1* | 6/2010 | Kim | ..................... | G09G 3/3648 345/690 |
| 2013/0057813 A1* | 3/2013 | Jeong | ................ | G02F 1/134309 349/110 |
| 2013/0057818 A1 | 3/2013 | Cho et al. | | |
| 2014/0049619 A1* | 2/2014 | Hsieh | ................. | G02F 1/136286 348/51 |
| 2015/0109554 A1* | 4/2015 | Lee | ........................ | H01L 27/124 349/48 |
| 2015/0145843 A1* | 5/2015 | Park | ......................... | G09G 3/20 345/209 |
| 2015/0168757 A1* | 6/2015 | Jeong | .................... | G02F 1/1368 349/41 |
| 2015/0235599 A1* | 8/2015 | Cho | .................... | H01L 27/1288 345/206 |
| 2015/0309360 A1* | 10/2015 | Wang | ................... | G09G 3/3607 345/694 |
| 2015/0325195 A1* | 11/2015 | Umezaki | .................. | G09G 3/20 345/100 |
| 2016/0026050 A1* | 1/2016 | Lin | .................... | G02F 1/136286 349/43 |
| 2018/0210251 A1* | 7/2018 | Kimura | ............. | G02F 1/136213 |

FOREIGN PATENT DOCUMENTS

| | | |
|---|---|---|
| KR | 10-2013-0025066 A | 3/2013 |
| KR | 10-2015-0078593 | 7/2015 |

* cited by examiner

LIQUID CRYSTAL DISPLAY DEVICE

CROSS-REFERENCE TO RELATED APPLICATIONS

This is a divisional application based on pending application Ser. No. 15/225,007, filed Aug. 1, 2016, the entire contents of which is hereby incorporated by reference.

Korean Patent Application No. 10-2015-0161496, filed on Nov. 18, 2015, and entitled, "Liquid Crystal Display Device," is incorporated by reference herein in its entirety.

BACKGROUND

1. Field

One or more embodiments described herein relate to a liquid crystal display device.

2. Description of the Related Art

A liquid crystal display (LCD) device is one of the most widely used types of flat panel displays. An LCD device typically includes a liquid crystal layer between substrates with electrodes disposed thereon. Liquid crystal molecules in the liquid crystal layer realign based on voltages applied to the electrodes. The realignment of the liquid crystal molecules adjusts the amount of transmitted light to display an image.

In such an LCD, one pixel may include independent sub-pixel electrodes to enhance visibility. Data signals of different levels may be applied to the sub-pixels electrodes through one data line. For example, a data signal may be applied to one of the sub-pixel electrodes without being modulated, and the data signal may be divided and applied to the other sub-pixel electrode. The pixel may include a voltage divider transistor for this purpose.

However, use of a voltage divider transistor may have drawbacks. For example, the voltage divider transistor may occupy a portion of a pixel area and thus may decrease the aperture ratio of the pixel. In addition, a data line and a storage electrode may be electrically connected to one another when the voltage divider transistor is turned on. Accordingly, the storage voltage of the storage electrode may vary due to the data signal.

SUMMARY

In accordance with one or more embodiments, a liquid crystal display device includes a plurality of pixels, at least one of the pixels including first, second, third, and fourth switches connected to at least one gate line and at least one data line; a first sub-pixel electrode connected to the first switch; a second sub-pixel electrode connected to the second switch; a third sub-pixel electrode connected to the third switch; a fourth sub-pixel electrode connected to the fourth switch; a first capacitor connected between a gate electrode and a source electrode of the first switch; a second capacitor connected between a gate electrode and a source electrode of the second switch; a third capacitor connected between a gate electrode and a source electrode of the third switch; and a fourth capacitor connected between a gate electrode and a source electrode of the fourth switch, and wherein at least two of the first, second, third, or fourth capacitors have different capacitance values from one another.

The first switch may be connected to a gate line, a data line, and the first sub-pixel electrode; the second switch may be connected to the gate line, the data line, and the second sub-pixel electrode; the third switch may be connected to the gate line, the data line, and the third sub-pixel electrode; and the fourth switch may be connected to the gate line, the data line, and the fourth sub-pixel electrode.

The first capacitor and the second capacitor may have different capacitance values from one another, and the third capacitor and the fourth capacitor may have different capacitance values from one another. The first capacitor and the fourth capacitor may have a same capacitance value as one another, and the second capacitor and the third capacitor may have a same capacitance value as one another.

The capacitance value of the second capacitor may be greater than the capacitance value of the first capacitor, and the capacitance value of the third capacitor may be greater than the capacitance value of the fourth capacitor. The first sub-pixel electrode and the second sub-pixel electrode may be adjacent to one another with the gate line therebetween, and the third sub-pixel electrode and the fourth sub-pixel electrode may be adjacent to one another with the gate line therebetween.

The first sub-pixel electrode and the third sub-pixel electrode may be adjacent to one another with the data line therebetween, and the second sub-pixel electrode and the fourth sub-pixel electrode may be adjacent to one another with the data line therebetween. The third capacitor in the at least one pixel and a first capacitor in another pixel connected to the gate line and another data line may have a same capacitance value as one another, and the fourth capacitor in the at least one pixel and a second capacitor in the another pixel may have a same capacitance value as one another. A data voltage to be applied to the data line and a data voltage to be applied to the another data line may have opposite polarities to one another.

The first switch may be connected to a gate line, a first data line, and the first sub-pixel electrode; the second switch may be connected to the gate line, the first data line, and the second sub-pixel electrode; the third switch may be connected to the gate line, a second data line, and the third sub-pixel electrode; and the fourth switch may be connected to the gate line, the second data line, and the fourth sub-pixel electrode.

The first capacitor and the second capacitor may have different capacitance values from one another, and the third capacitor and the fourth capacitor may have different capacitance values from one another. The first capacitor and the third capacitor may have a same capacitance value as one another, and the second capacitor and the fourth capacitor may have a same capacitance value as one another.

The capacitance value of the second capacitor may be greater than the capacitance value of the first capacitor, and the capacitance value of the fourth capacitor may be greater than the capacitance value of the third capacitor. The first switch may be connected to a first gate line, a data line, and the first sub-pixel electrode; the second switch may be connected to a second gate line, the data line, and the second sub-pixel electrode; the third switch may be connected to the first gate line, the data line, and the third sub-pixel electrode; and the fourth switch may be connected to the second gate line, the data line, and the fourth sub-pixel electrode.

The first capacitor and the second capacitor may have different capacitance values from one another, and the third capacitor and the fourth capacitor may have different capacitance values from one another. The first capacitor and the fourth capacitor may have a same capacitance value as one another, and the second capacitor and the third capacitor may have a same capacitance value as one another.

The capacitance value of the second capacitor may be greater than the capacitance value of the first capacitor, and the capacitance value of the third capacitor may be greater than the capacitance value of the fourth capacitor. The third capacitor the at least one pixel and a first capacitor in another pixel connected to the first gate line, the second gate line, and another data line may have a same capacitance value as one another, and the fourth capacitor in the at least one pixel and a second capacitor in the another pixel may have a same capacitance value as one another An overlapping area between a gate electrode and a source electrode of one of the switches may be different from an overlapping area between a gate electrode and a source electrode of at least another one of the switches. The at least one pixel may be driven in a time division scheme.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
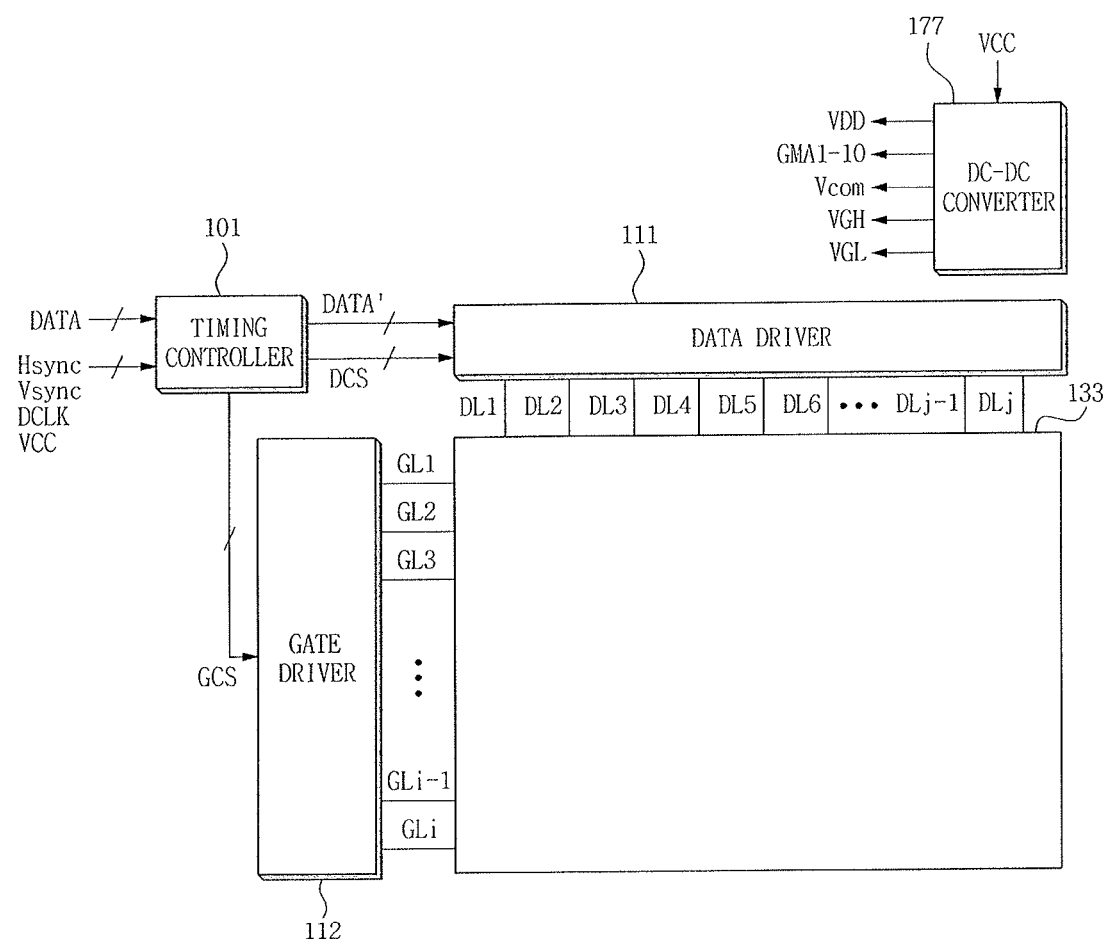
FIG. 1 illustrates a block diagram of a liquid crystal display ("LCD") device according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. The embodiments may be combined to form additional embodiments.

In the drawings, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

When an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include another component instead of excluding another component unless there is different disclosure.

Figure 2:
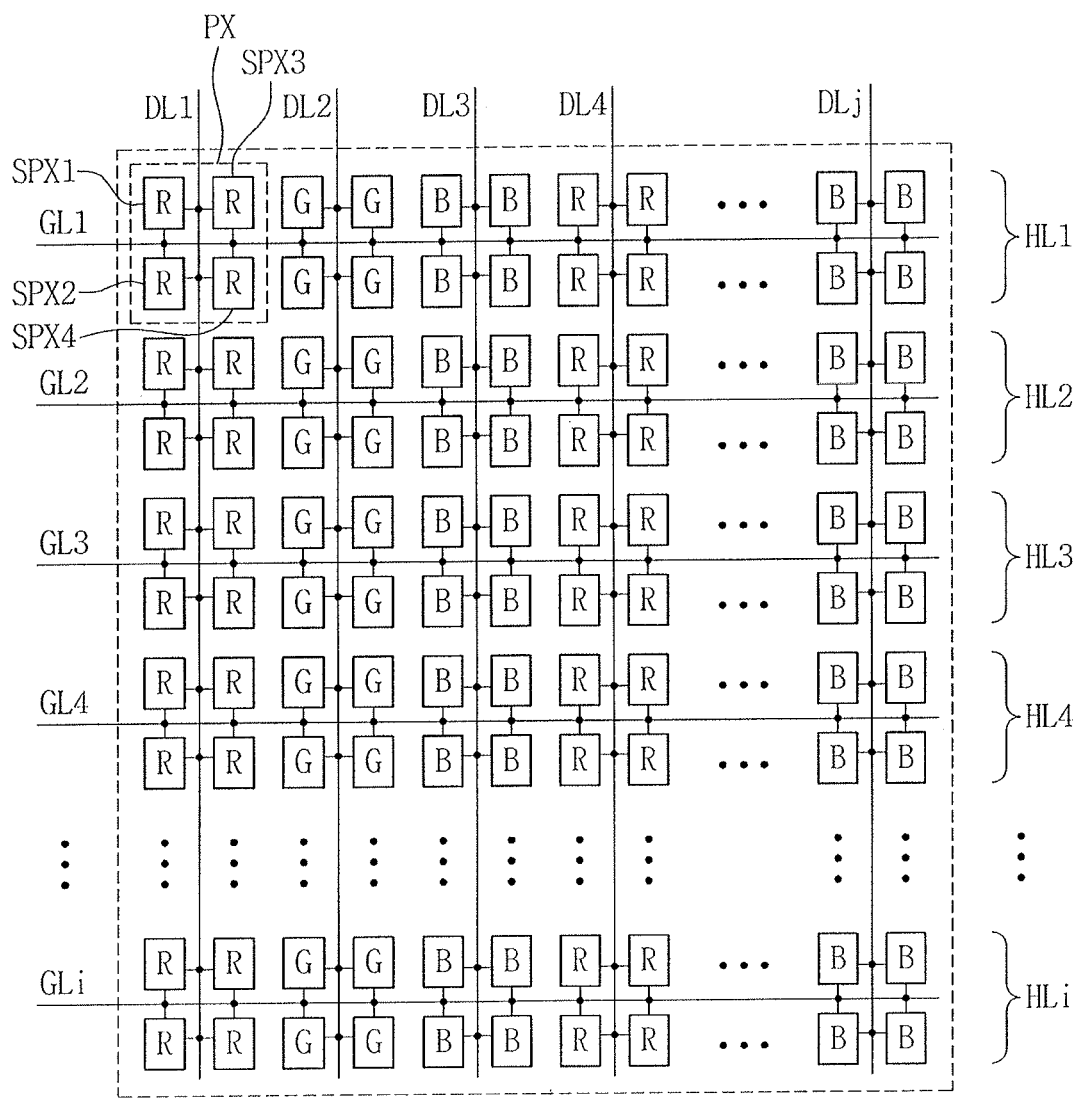
FIG. 2 illustrates a configuration view of a display panel illustrated in FIG. 1.

FIG. 1 illustrates a block diagram of a liquid crystal display ("LCD") device according to an exemplary embodiment, and FIG. 2 illustrates a configuration view of a display panel illustrated in FIG. 1.

Referring to FIG. 1, the LCD device includes a display panel 133, a timing controller 101, a gate driver 112, a data driver 111, and a direct current to direct current ("DC-DC") converter 177. The display panel 133 is configured to display an image. The display panel 133 includes a liquid crystal layer 333 (refer, e.g., to FIG. 11A) between a first substrate 301 (refer, e.g., to FIG. 11A) and a second substrate 302 (refer, e.g., to FIG. 11A).

Referring to FIG. 2, the display panel 133 includes a plurality of gate lines GL1 to GLi, a plurality of data lines DL1 to DLj, and a plurality of pixels PX. The gate lines GL1 to GLi intersect the data lines DL1 to DLj. The pixels PX are arranged along horizontal lines HL1 to HLi and are connected to the gate lines GL1 to GLi and the data lines DL1 to DLj. In an exemplary embodiment, j pixels are arranged along an n-th horizontal line. The j pixels may be referred to as "n-th horizontal line pixels," and may be connected to the first to j-th data lines DL1 to DLj, respectively.

In such an exemplary embodiment, the n-th horizontal line pixels are connected to an n-th gate line in common. Accordingly, the n-th horizontal line pixels receive an n-th gate signal in common. All the j pixels arranged along the same horizontal line may receive the same gate signal, while pixels disposed on different horizontal lines may receive different gate signals from one another. In an exemplary embodiment, all pixels on a first horizontal line HL1 receive a first gate signal, while all pixels on a second horizontal line HL2 receive a second gate signal having a different timing from that of the first gate signal.

As illustrated in FIG. 2, each pixel PX includes four sub-pixels SPX1, SPX2, SPX3, and SPX4 connected to one gate line and one data line in common. For example, the first sub-pixel SPX1, second sub-pixel SPX2, third sub-pixel SPX3, and fourth sub-pixel SPX4 are connected in common to a first gate line GL1 and a first data line DL1. The pixels in FIG. 2 may emit red (R) color, a green (G) color, and a blue (B) color. As illustrated in FIG. 2, in an exemplary embodiment, all of the first, second, third, and fourth sub-pixels SPX1, SPX2, SPX3, and SPX4 emit light of a red color. In a similar manner, other pixels PX in FIG. 2 include four sub-pixels that emit light of red or blue light. In another embodiment, the pixels may emit light of another combination of colors.

The pixels PX may be driven in a time division scheme. For example, when one frame period includes two sub-frame periods (e.g., a first sub-frame period and a second sub-frame period), data voltages having a positive polarity may be applied to respective pixels during the first sub-frame period and data voltages having a negative polarity may be applied to the respective pixels during the second sub-frame period.

In such an example, respective ones of the data voltages applied to the same pixel during the first sub-frame period and the second sub-frame period may have the same level. However, the data voltages have opposite polarities. For example, a first data voltage applied to the pixel PX during the first sub-frame period and a second data voltage applied to the pixel PX during the second sub-frame period have the same level. However, the first data voltage and the second data voltage have opposite polarities, e.g., when the first data voltage is positive, the second data voltage is negative.

In another exemplary embodiment, one frame period may include two or more sub-frame periods. In such an exemplary embodiment, respective ones of the data voltages applied to the same pixel during the two or more sub-frame periods have the same level. However, data voltages in adjacent ones of the sub-frame periods have opposite polarities.

The timing controller 101 receives a vertical synchronization signal Vsync, a horizontal synchronization signal Hsync, an image data signal DATA, and a clock signal DCLK output from a graphic controller in a system. An interface circuit is provided between the timing controller 101 and the system. The aforementioned signals output from the system are input to the timing controller 101 via the interface circuit. In an exemplary embodiment, the interface circuit may be in timing controller 101.

The interface circuit includes a low voltage differential signaling ("LVDS") receiver. The interface circuit lowers respective voltage levels of the vertical synchronization signal Vsync, the horizontal synchronization signal Hsync, the image data signal DATA, and the clock signal DCLK output from the system and increases respective frequencies thereof.

Due to a high-frequency component of the signal input from the interface circuit to the timing controller 101, electromagnetic interference ("EMI") may occur between the interface circuit and the timing controller 101. In order to prevent EMI, an EMI filter may be provided between the interface circuit and the timing controller 101.

The timing controller 101 generates a gate control signal GCS for controlling the gate driver 112 and a data control signal DCS for controlling the data driver 111, based on the vertical synchronization signal Vsync, the horizontal synchronization signal Hsync, and the clock signal DCLK. In an exemplary embodiment, the gate control signal GCS includes a gate start pulse, a gate shift clock, a gate output enable signal, and the like. In an exemplary embodiment, the data control signal DCS includes a source start pulse, a source shift clock, a source output enable signal, a polarity signal, and the like.

The timing controller 101 rearranges the image data signals DATA input through the system and provides the rearranged image data signals DATA' to the data driver 111.

The timing controller 101 may be operated by a driving power VCC output from a power supply unit in the system. For example, the driving power VCC is used as a power voltage of a phase lock loop ("PLL") in the timing controller 101. The PLL compares a frequency of the clock signal DCLK input to the timing controller 101 and a reference frequency generated by an oscillator. When a difference is verified between the compared frequencies based on the comparison results, the PLL adjusts the frequency of the clock signal DCLK by a level based on the difference to thereby generate a sampling clock signal. The sampling clock signal is used to sample the image data signals DATA'.

The DC-DC converter 177 may increase or decrease the driving power VCC input through the system, to thereby generate voltages for the display panel 133. The DC-DC converter 177 may include, for example, an output switching element for switching an output voltage of an output terminal thereof, and a pulse width modulator ("PWM") for adjusting a duty ratio or a frequency of a control signal applied to a control terminal of the output switching element in order to increase or decrease the output voltage. In one embodiment, the DC-DC converter 177 may include a pulse frequency modulator ("PFM"), in lieu of the PWM.

The PWM increases the duty ratio of the control signal to increase the output voltage of the DC-DC converter 177, or decreases the duty ratio of the control signal to lower the output voltage of the DC-DC converter 177. The PFM increases the frequency of the control signal to increase the output voltage of the DC-DC converter 177, or decreases the frequency of the control signal to lower the output voltage of the DC-DC converter 177. In an exemplary embodiment, the output voltage of the DC-DC converter 177 includes a reference voltage VDD (e.g, about 6 V or higher), a gamma reference voltage GMA1-10 of lower than level 10, a common voltage Vcom (e.g., in a range of about 2.5 V to about 3.3 V), a gate high voltage VGH (e.g., about 15 V or higher), and a gate low voltage VGL (e.g., about −4 V or lower).

The gamma reference voltage GMA1-10 is a voltage generated by dividing the reference voltage VDD. The reference voltage VDD and the gamma reference voltage GMA1-10 are analog gamma voltages provided to the data driver 111. The common voltage Vcom may be applied to a common electrode of the display panel 133 via the data driver 111. The gate high voltage VGH is a high logic voltage of the gate signal, which is set to be a threshold voltage of a switching element in the pixel or higher. The gate low voltage VGL is a low logic voltage of the gate signal, which is set to be an off-voltage of the switching element. The gate high voltage VGH and the gate low voltage VGL are applied to the gate driver 112.

The gate driver 112 generates gate signals based on the gate control signal GCS from the timing controller 101 and sequentially applies the gate signals to the gate lines GL1 to GLi. In an exemplary embodiment, the gate driver 112 may include, for example, a shift register to shift the gate start pulse based on the gate shift clock to thereby generate the gate signals. The shift register may include a plurality of driving switching elements disposed in a non-display area of the display panel 133. The driving switching elements and the switching element of the pixel may be manufactured, for example, in the same process.

In an exemplary embodiment, the data driver 111 receives the image data signals DATA' and the data control signal DCS from the timing controller 101. The data driver 111 performs sampling of the image data signals DATA' based on the data control signal DCS, performs latching of the sampled image data signals corresponding to one horizontal line for each horizontal period, and applies the latched image data signals to the data lines DL1 to DLj. In such an exemplary embodiment, the data driver 111 converts the image data signals DATA' from the timing controller 101 to analog image data signals using the gamma reference voltages GMA1-10 from the DC-DC converter 177 and provides the analog image data signals to the data lines DL1 to DLj.

Figure 3:
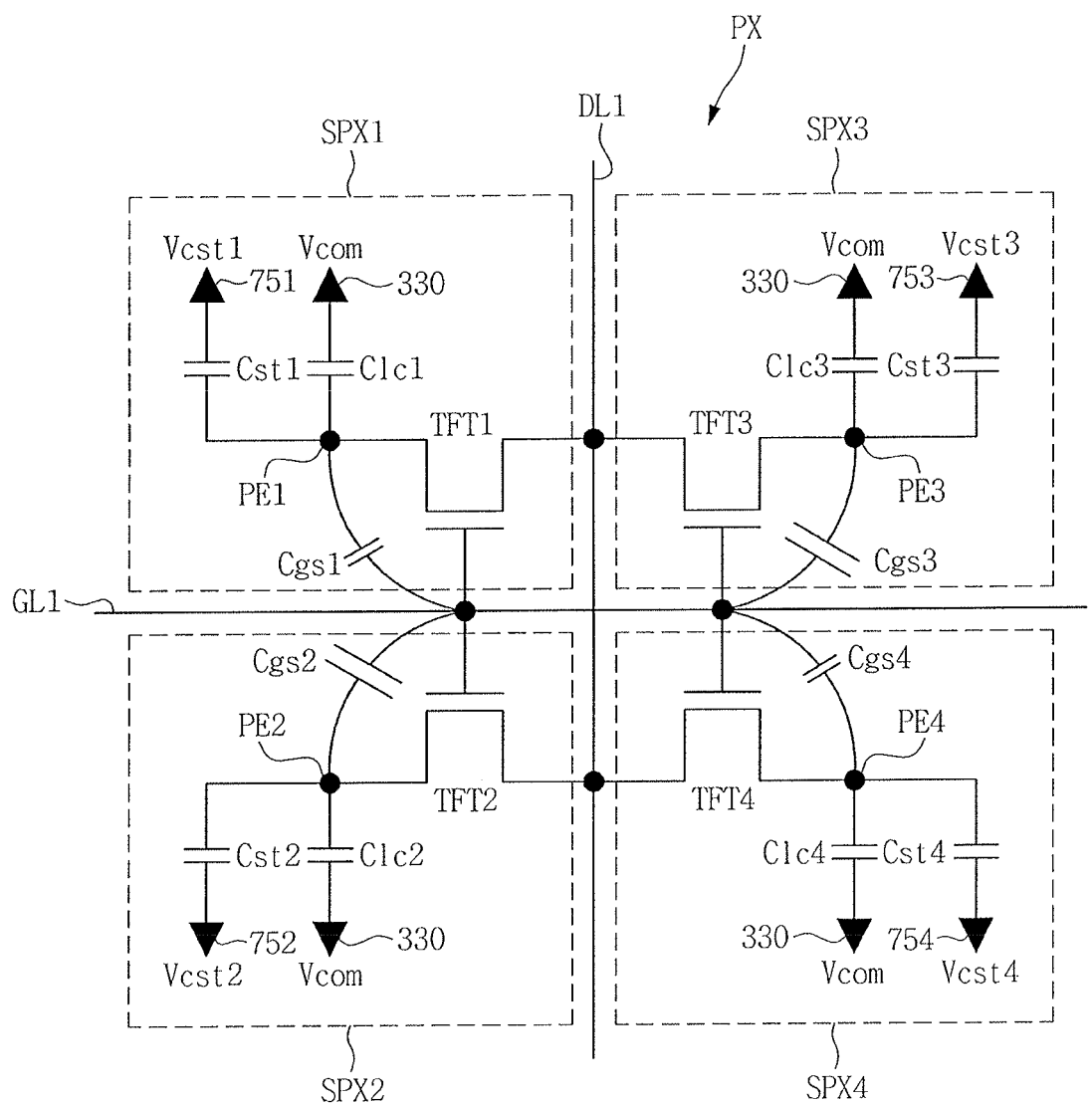
FIG. 3 illustrates an equivalent circuit diagram of a pixel of FIG. 2.

FIG. 3 illustrates an example of an equivalent circuit the pixel PX in FIG. 2. As illustrated in FIG. 3, the pixel PX includes a first switching element TFT1, a second switching element TFT2, a third switching element TFT3, a fourth switching element TFT4, a first sub-pixel electrode PE1, a second sub-pixel electrode PE2, a third sub-pixel electrode PE3, a fourth sub-pixel electrode PE4, a first liquid crystal capacitor Clc1, a second liquid crystal capacitor Clc2, a third liquid crystal capacitor Clc3, a fourth liquid crystal capacitor Clc4, a first storage capacitor Cst1, a second storage capacitor Cst2, a third storage capacitor Cst3, a fourth storage capacitor Cst4, a first parasitic capacitor Cgs1, a second parasitic capacitor Cgs2, a third parasitic capacitor Cgs3, and a fourth parasitic capacitor Cgs4.

As previously described, the pixel PX includes a first sub-pixel SPX1, a second sub-pixel SPX2, a third sub-pixel SPX3, and a fourth sub-pixel SPX4.

The first switching element TFT1, the first sub-pixel electrode PE1, the first liquid crystal capacitor Clc1, the first storage capacitor Cst1, and the first parasitic capacitor Cgs1 are in the first sub-pixel SPX1. In an exemplary embodiment, the first switching element TFT1 is connected to a first gate line GL1, a first data line DL1, and the first sub-pixel electrode PE1. In such an exemplary embodiment, the first switching element TFT1 includes a gate electrode connected to the first gate line GL1, a drain electrode connected to the first data line DL1, and a source electrode connected to the first sub-pixel electrode PE1.

The first switching element TFT1 is turned on by a gate high voltage VGH of a gate signal applied from the first gate line GL1. When turned on, the first switching element TFT1 applies a data voltage from the first data line DL1 to the first sub-pixel electrode PE1. The first switching element TFT1 is turned off by a gate low voltage VGL of the gate signal. The data voltage may be an image data voltage based on the image data signal.

The first liquid crystal capacitor Clc1 is between the first sub-pixel electrode PE1 and a common electrode 330. The first liquid crystal capacitor Clc1 includes a first electrode connected to the first sub-pixel electrode PE1, a second electrode connected to the common electrode 330, and a liquid crystal layer between the first electrode and the second electrode. The first electrode of the first liquid crystal capacitor Clc1 may be a portion of the first sub-pixel electrode PE1. The second electrode of the first liquid crystal capacitor Clc1 may be a portion of the common electrode 330.

The common voltage Vcom is applied to the common electrode 330.

The first storage capacitor Cst1 is between the first sub-pixel electrode PE1 and a first storage electrode 751. The first storage capacitor Cst1 includes a first electrode connected to the first sub-pixel electrode PE1, a second electrode connected to the first storage electrode 751, and a dielectric material between the first electrode and the second electrode of the first storage capacitor Cst1. The dielectric material includes at least one insulating layer. The first electrode of the first storage capacitor Cst1 may be a portion of the first sub-pixel electrode PE1. The second electrode of the first storage capacitor Cst1 may be a portion of the first storage electrode 751.

A first storage voltage Vcst1 is applied to the first storage electrode 751. In one embodiment, the first storage voltage Vcst1 and the common voltage Vcom may have the same level.

The first parasitic capacitor Cgs1 is between the gate electrode and the source electrode of the first switching element TFT1. The first parasitic capacitor Cgs1 includes a first electrode connected to the gate electrode of the first switching element TFT1, a second electrode connected to the source electrode of the first switching element TFT1, and a dielectric material between the first electrode and the second electrode of the first parasitic capacitor Cgs1. The dielectric material includes at least one insulating layer. The first electrode of the first parasitic capacitor Cgs1 may be a portion of the gate electrode of the first switching element TFT1. The second electrode of the first parasitic capacitor Cgs1 may be a portion of the source electrode of first switching element TFT1.

Among the aforementioned components of the pixel PX, the second switching element TFT2, the second sub-pixel electrode PE2, the second liquid crystal capacitor Clc2, the second storage capacitor Cst2, and the second parasitic capacitor Cgs2 are in the second sub-pixel SPX2.

In an exemplary embodiment, the second switching element TFT2 is connected to the first gate line GL1, the first data line DL1, and the second sub-pixel electrode PE2. In such an exemplary embodiment, the second switching element TFT2 includes a gate electrode connected to the first gate line GL1, a drain electrode connected to the first data line DL1, and a source electrode connected to the second sub-pixel electrode PE2.

The second switching element TFT2 is turned on by the gate high voltage VGH of the gate signal applied from the first gate line GL1. When turned on, the second switching element TFT2 applies the data voltage from the first data line DL1 to the second sub-pixel electrode PE2. The second switching element TFT2 is turned off by the gate low voltage VGL of the gate signal.

The second liquid crystal capacitor Clc2 is between the second sub-pixel electrode PE2 and the common electrode 330. The second liquid crystal capacitor Clc2 includes a first electrode connected to the second sub-pixel electrode PE2, a second electrode connected to the common electrode 330, and a liquid crystal layer between the first electrode and the second electrode of the second liquid crystal capacitor Clc2. The first electrode of the second liquid crystal capacitor Clc2 may be a portion of the second sub-pixel electrode PE2. The second electrode of the second liquid crystal capacitor Clc2 may be a portion of the common electrode 330.

The second storage capacitor Cst2 is between the second sub-pixel electrode PE2 and a second storage electrode 752. The second storage capacitor Cst2 includes a first electrode connected to the second sub-pixel electrode PE2, a second electrode connected to the second storage electrode 752, and a dielectric material between the first electrode and the second electrode of the second storage capacitor Cst2. The dielectric material includes at least one insulating layer. The first electrode of the second storage capacitor Cst2 may be a portion of the second sub-pixel electrode PE2. The second electrode of the second storage capacitor Cst2 may be a portion of the second storage electrode 752.

A second storage voltage Vcst2 is applied to the second storage electrode 752. In one embodiment, the second storage voltage Vcst2 and the common voltage Vcom may have the same level.

The second parasitic capacitor Cgs2 is between the gate electrode and the source electrode of the second switching element TFT2. The second parasitic capacitor Cgs2 includes a first electrode connected to the gate electrode of the second switching element TFT2, a second electrode connected to the source electrode of the second switching element TFT2, and a dielectric material between the first electrode and the second electrode of the second parasitic capacitor Cgs2. The dielectric material includes at least one insulating layer. The first electrode of the second parasitic capacitor Cgs2 may be a portion of the gate electrode of the second switching element TFT2. The second electrode of the second parasitic capacitor Cgs2 may be a portion of the source electrode of the second switching element TFT2.

Among the aforementioned components of the pixel PX, the third switching element TFT3, the third sub-pixel electrode PE3, the third liquid crystal capacitor Clc3, the third storage capacitor Cst3, and the third parasitic capacitor Cgs3 are in the third sub-pixel SPX3.

In an exemplary embodiment, the third switching element TFT3 is connected to the first gate line GL1, the first data line DL1, and the third sub-pixel electrode PE3. In such an exemplary embodiment, the third switching element TFT3 includes a gate electrode connected to the first gate line GL1, a drain electrode connected to the first data line DL1, and a source electrode connected to the third sub-pixel electrode PE3.

The third switching element TFT3 is turned on by the gate high voltage VGH of the gate signal applied from the first gate line GL1. The third switching element TFT3, when turned on, applies the data voltage from the first data line DL1 to the third sub-pixel electrode PE3. The third switching element TFT3 is turned off by the gate low voltage VGL of the gate signal.

The third liquid crystal capacitor Clc3 is between the third sub-pixel electrode PE3 and the common electrode 330. The third liquid crystal capacitor Clc3 includes a first electrode connected to the third sub-pixel electrode PE3, a second electrode connected to the common electrode 330, and a liquid crystal layer between the first electrode and the second electrode of the third liquid crystal capacitor Clc3. The first electrode of the third liquid crystal capacitor Clc3 may be a portion of the third sub-pixel electrode PE3. The second electrode of the third liquid crystal capacitor Clc3 may be a portion of the common electrode 330.

The third storage capacitor Cst3 is between the third sub-pixel electrode PE3 and a third storage electrode 753. The third storage capacitor Cst3 includes a first electrode connected to the third sub-pixel electrode PE3, a second electrode connected to the third storage electrode 753, and a dielectric material between the first electrode and the second electrode of the third storage capacitor Cst3. The dielectric material includes at least one insulating layer. The first electrode of the third storage capacitor Cst3 may be a portion of the third sub-pixel electrode PE3. The second electrode of the third storage capacitor Cst3 may be a portion of the third storage electrode 753.

A third storage voltage Vcst3 is applied to the third storage electrode 753. In one embodiment, the third storage voltage Vcst3 and the common voltage Vcom may have the same level.

The third parasitic capacitor Cgs3 is between the gate electrode and the source electrode of the third switching element TFT3. The third parasitic capacitor Cgs3 includes a first electrode connected to the gate electrode of the third switching element TFT3, a second electrode connected to the source electrode of the third switching element TFT3, and a dielectric material between the first electrode and the second electrode of the third parasitic capacitor Cgs3. The dielectric material includes at least one insulating layer. The first electrode of the third parasitic capacitor Cgs3 may be a portion of the gate electrode of the third switching element TFT3. The second electrode of the third parasitic capacitor Cgs3 may be a portion of the source electrode of the third switching element TFT3.

Among the aforementioned components of the pixel PX, the fourth switching element TFT4, the fourth sub-pixel electrode PE4, the fourth liquid crystal capacitor Clc4, the fourth storage capacitor Cst4, and the fourth parasitic capacitor Cgs4 are in the fourth sub-pixel SPX4.

In an exemplary embodiment, the fourth switching element TFT4 is connected to the first gate line GL1, the first data line DL1, and the fourth sub-pixel electrode PE4. In such an exemplary embodiment, the fourth switching element TFT4 includes a gate electrode connected to the first gate line GL1, a drain electrode connected to the first data line DL1, and a source electrode connected to the fourth sub-pixel electrode PE4.

The fourth switching element TFT4 is turned on by the gate high voltage VGH of the gate signal applied from the first gate line GL1. When turned on, the fourth switching element TFT4 applies the data voltage from the first data line DL1 to the fourth sub-pixel electrode PE4. The fourth switching element TFT4 is turned off by the gate low voltage VGL of the gate signal.

The fourth liquid crystal capacitor Clc4 is between the fourth sub-pixel electrode PE4 and the common electrode 330. The fourth liquid crystal capacitor Clc4 includes a first electrode connected to the fourth sub-pixel electrode PE4, a second electrode connected to the common electrode 330, and a liquid crystal layer between the first electrode and the second electrode of the fourth liquid crystal capacitor Clc4. The first electrode of the fourth liquid crystal capacitor Clc4 may be a portion of the fourth sub-pixel electrode PE4. The second electrode of the fourth liquid crystal capacitor Clc4 may be a portion of the common electrode 330.

The fourth storage capacitor Cst4 is between the fourth sub-pixel electrode PE4 and a fourth storage electrode 754. The fourth storage capacitor Cst4 includes a first electrode connected to the fourth sub-pixel electrode PE4, a second electrode connected to the fourth storage electrode 754, and a dielectric material between the first electrode and the second electrode of the fourth storage capacitor Cst4. The dielectric material includes at least one insulating layer. The first electrode of the fourth storage capacitor Cst4 may be a portion of the fourth sub-pixel electrode PE4. The second electrode of the fourth storage capacitor Cst4 may be a portion of the fourth storage electrode 754.

A fourth storage voltage Vcst4 is applied to the fourth storage electrode 754. In one embodiment, the fourth storage voltage Vcst4 and the common voltage Vcom may have the same level.

The fourth parasitic capacitor Cgs4 is between the gate electrode and the source electrode of the fourth switching element TFT4. The fourth parasitic capacitor Cgs4 includes a first electrode connected to the gate electrode of the fourth switching element TFT4, a second electrode connected to the source electrode of the fourth switching element TFT4, and a dielectric material between the first electrode and the second electrode of the fourth parasitic capacitor Cgs4. The dielectric material includes at least one insulating layer. The first electrode of the fourth parasitic capacitor Cgs4 may be a portion of the gate electrode of the fourth switching element TFT4. The second electrode of the fourth parasitic capacitor Cgs4 may be a portion of the source electrode of the fourth switching element TFT4.

The first, second, third, and fourth sub-pixels SPX1, SPX2, SPX3, and SPX4 include the first, second, third, and fourth parasitic capacitors Cgs1, Cgs2, Cgs3, and Cgs4, respectively. At least two of the first, second, third, and fourth parasitic capacitors Cgs1, Cgs2, Cgs3, and Cgs4 may have different capacitance values from one another. For example, the first parasitic capacitor Cgs1 and the second parasitic capacitor Cgs2 may have different capacitance values from one another, and the third parasitic capacitor Cgs3 and the fourth parasitic capacitor Cgs4 may have different capacitance values from one another. In such an example, the capacitance value of the second parasitic capacitor Cgs2 may be greater than the capacitance value of the first parasitic capacitor Cgs1. In addition, the capacitance value of the third parasitic capacitor Cgs3 may be greater than the capacitance value of the fourth parasitic capacitor Cgs4. In one embodiment, the capacitance value of the first parasitic capacitor Cgs1 may be the same as the capacitance value of the fourth parasitic capacitor Cgs4, and the capacitance value of the second parasitic capacitor Cgs2 may be the same as the capacitance value of the third parasitic capacitor Cgs3.

In FIG. 3, a parasitic capacitor having a relatively great capacitance value is illustrated as being relatively large and a parasitic capacitor having a relatively small capacitance value is illustrated as being relatively small, so that the capacitance values of the first, second, third, and fourth parasitic capacitors Cgs1, Cgs2, Cgs3, and Cgs4 may be readily compared. In an exemplary embodiment, the capacitance values of the second and third parasitic capacitors Cgs2 and Cgs3, illustrated as being relatively large, are greater than the capacitance values of the first and fourth parasitic capacitors Cgs1 and Cgs4, illustrated as being smaller than the second and third parasitic capacitors Cgs2 and Cgs3. The first and fourth parasitic capacitors Cgs1 and Cgs4, illustrated as having the same size, have the same capacitance value. In a similar manner, the second and third parasitic capacitors Cgs2 and Cgs3, illustrated as having the same size, have the same capacitance value. However, such may only apply to the first, second, third, and fourth parasitic capacitors Cgs1, Cgs2, Cgs3, and Cgs4.

In FIG. 3, the first, second, third, and fourth liquid crystal capacitors Clc1, Clc2, Clc3, and Clc4 have the same size. Also, in FIG. 3, the first, second, third, and fourth storage capacitors Cst1, Cst2, Cst3, and Cst4 have the same size. However, there may be no correlation between the sizes and capacitance values of the first, second, third, and fourth liquid crystal capacitors Clc1, Clc2, Clc3, and Clc4 and between the sizes and the capacitance values of the first, second, third, and fourth storage capacitors Cst1, Cst2, Cst3, and Cst4. In such an exemplary embodiment, the first, second, third, and fourth liquid crystal capacitors Clc1, Clc2, Clc3, and Clc4 may have different capacitance values from one another, and the first, second, third, and fourth storage capacitors Cst1, Cst2, Cst3, and Cst4 may have different capacitance values from one another.

As such, in an exemplary embodiment, the first parasitic capacitor Cgs1 and the second parasitic capacitor Cgs2 have different capacitance values from one another, and the third parasitic capacitor Cgs3 and the fourth parasitic capacitor Cgs4 have different capacitance values from one another. Accordingly, the first sub-pixel SPX1 and the second sub-pixel SPX2 may have different kick-back voltages from one another, and the third sub-pixel SPX3 and the fourth sub-pixel SPX4 may have different kick-back voltages from one another.

In such an exemplary embodiment, although data voltages having the same level are respectively applied to the first, second, third, and fourth sub-pixels SPX1, SPX2, SPX3, and SPX4, the first sub-pixel SPX1 and the second sub-pixel SPX2 may have pixel voltages of different levels from one another, and the third sub-pixel SPX3 and the fourth sub-pixel SPX4 may have pixel voltages of different levels from one another. Thus, visibility of the LCD device may be enhanced.

Figure 4:
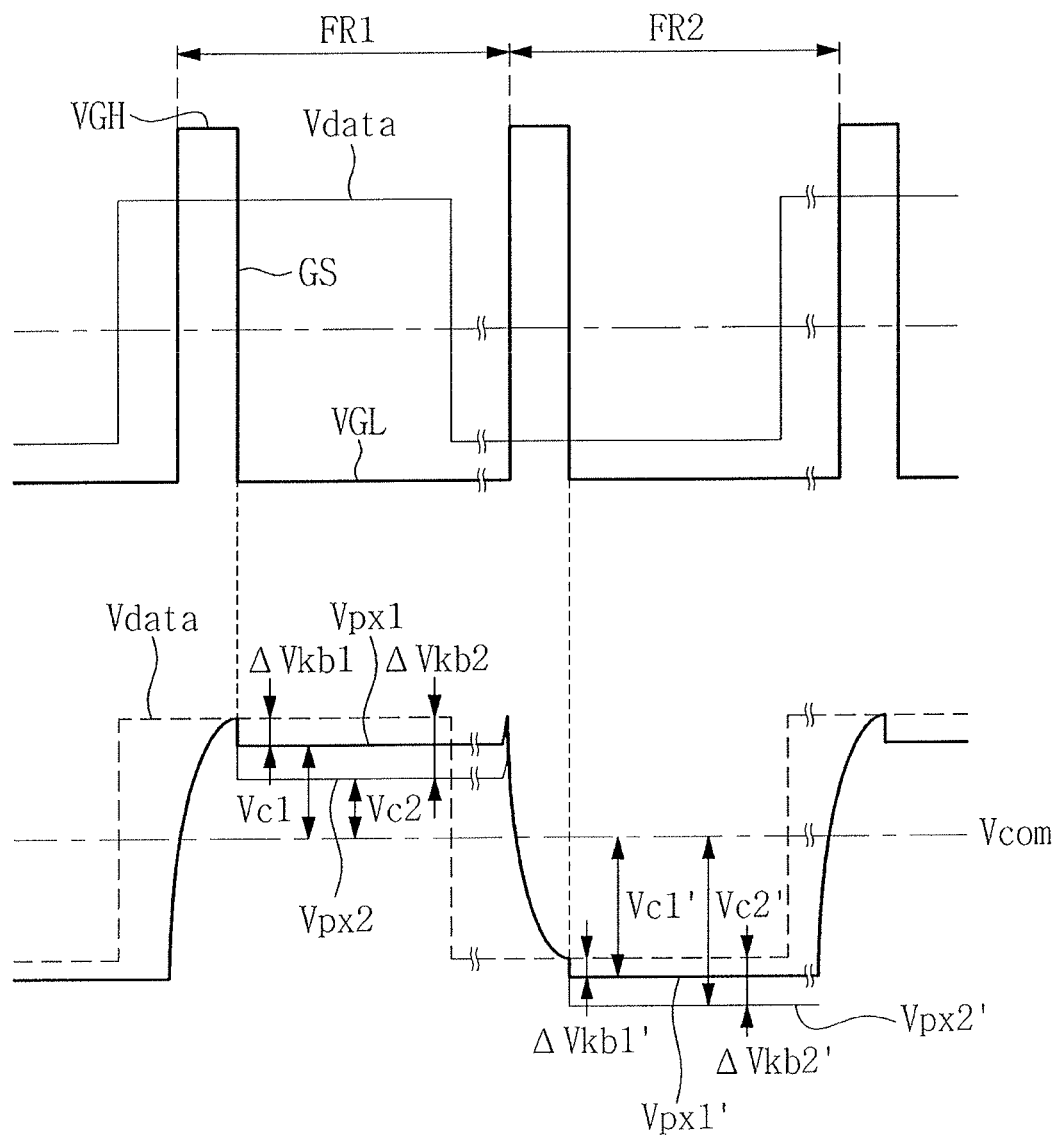
FIG. 4 illustrates an example of a gate signal, a data voltage, a kick-back voltage, and a pixel voltage.

FIG. 4 illustrates an example of a gate signal, a data voltage, a kick-back voltage, and a pixel voltage. The level of a sub-pixel voltage (a first sub-pixel voltage) applied to the first sub-pixel electrode PE1 through the first switching element TFT1 may be defined by Equation 1.

$$Vpx1 = Vdata - \frac{C\_Cgs1}{C\_Cgs1 + C\_Clc1 + C\_Cst1} \Delta V_{gs} \qquad (1)$$

In Equation 1, Vpx1 denotes the first sub-pixel voltage, Vdata denotes the data voltage applied to the first data line DL1, C_Cgs1 denotes the capacitance value of the first parasitic capacitor Cgs1, C_Clc1 denotes the capacitance value of the first liquid crystal capacitor Clc1, C_Cst1 denotes the capacitance value of the first storage capacitor Cst1, and $\Delta V_{gs}$ denotes a voltage level difference between a gate high voltage VGH and a gate low voltage VGL of a gate signal GS applied to the first gate line GL1.

In Equation 1, "{C_Cgs1/(C_Cgs1+C_Clc1+C_Cst1) *$\Delta V_{gs}$}" represents a kick-back voltage (first kick-back voltage: $\Delta$Vkb1) with respect to the data voltage applied to the first sub-pixel electrode PE1. As illustrated in FIG. 4, in an exemplary embodiment, due to transition of the gate signal GS when the gate signal GS drops from a gate high voltage VGH to a gate low voltage VGL, the first sub-pixel voltage Vpx1 changes in the transition direction. In such an exemplary embodiment, the first kick-back voltage $\Delta$Vkb1 refers to a variation in the first sub-pixel voltage Vpx1. In an exemplary embodiment, the first sub-pixel voltage Vpx1 applied to the first sub-pixel electrode PE1 decreases by the first kick-back voltage $\Delta$Vkb1.

The level of a sub-pixel voltage (second sub-pixel voltage) applied to the second sub-pixel electrode PE2 through the second switching element TFT2 may be defined by Equation 2.

$$Vpx2 = Vdata - \frac{C\_Cgs2}{C\_Cgs2 + C\_Clc2 + C\_Cst2} \Delta V_{gs} \qquad (2)$$

In Equation 2, Vpx2 denotes the second sub-pixel voltage, Vdata denotes the data voltage applied to the first data line DL1, C_Cgs2 denotes the capacitance value of the second parasitic capacitor Cgs2, C_Clc2 denotes the capacitance value of the second liquid crystal capacitor Clc2, C_Cst2 denotes the capacitance value of the second storage capacitor Cst2, and $\Delta V_{gs}$ denotes a voltage level difference between the gate high voltage VGH and the gate low voltage VGL of the gate signal GS applied to the first gate line GL1.

In Equation 2, "{C_Cgs2/(C_Cgs2+C_Clc2+C_Cst2) *ΔV$_{gs}$}" represents a kick-back voltage (second kick-back voltage: ΔVkb2) with respect to the data voltage applied to the second sub-pixel electrode PE2. As illustrated in FIG. 4, in an exemplary embodiment, due to the transition of the gate signal GS when the gate signal GS drops from the gate high voltage VGH to the gate low voltage VGL, the second sub-pixel voltage Vpx2 changes in the transition direction. In such an exemplary embodiment, the second kick-back voltage ΔVkb2 refers to a variation in the second sub-pixel voltage Vpx2. In an exemplary embodiment, the second sub-pixel voltage Vpx2 applied to the second sub-pixel electrode PE2 decreases by the second kick-back voltage ΔVkb2.

The level of a sub-pixel voltage (third sub-pixel voltage) applied to the third sub-pixel electrode PE3 through the third switching element TFT3 may be defined by Equation 3.

$$Vpx3 = Vdata - \frac{C\_Cgs3}{C\_Cgs3 + C\_Clc3 + C\_Cst3} \Delta V_{gs} \quad (3)$$

In Equation 3, Vpx3 denotes the third sub-pixel voltage, Vdata denotes the data voltage applied to the first data line DL1, C_Cgs3 denotes the capacitance value of the third parasitic capacitor Cgs3, C_Clc3 denotes the capacitance value of the third liquid crystal capacitor Clc3, C_Cst3 denotes the capacitance value of the third storage capacitor Cst3, and ΔV$_{gs}$ denotes a voltage level difference between the gate high voltage VGH and the gate low voltage VGL of the gate signal GS applied to the first gate line GL1.

In Equation 3, "{C_Cgs3/(C_Cgs3+C_Clc3+C_Cst3) *ΔV$_{gs}$}" represents a kick-back voltage (third kick-back voltage) with respect to the data voltage applied to the third sub-pixel electrode PE3. In an exemplary embodiment, due to the transition of the gate signal GS when the gate signal GS drops from the gate high voltage VGH to the gate low voltage VGL, the third sub-pixel voltage Vpx3 changes in the transition direction. In such an exemplary embodiment, the third kick-back voltage refers to a variation in the third sub-pixel voltage Vpx3. In an exemplary embodiment, the third sub-pixel voltage Vpx3 applied to the third sub-pixel electrode PE3 decreases by the third kick-back voltage. The third kick-back voltage and the first kick-back voltage ΔVkb1 may have the same magnitude.

The level of a sub-pixel voltage (fourth sub-pixel voltage) applied to the fourth sub-pixel electrode PE4 through the fourth switching element TFT4 may be defined by Equation 4.

$$Vpx4 = Vdata - \frac{C\_Cgs4}{C\_Cgs4 + C\_Clsc4 + C\_Cst4} \Delta V_{gs} \quad (4)$$

In Equation 4, Vpx4 denotes the fourth sub-pixel voltage, Vdata denotes the data voltage applied to the first data line DL1, C_Cgs4 denotes the capacitance value of the fourth parasitic capacitor Cgs4, C_Clc4 denotes the capacitance value of the fourth liquid crystal capacitor Clc4, C_Cst4 denotes the capacitance value of the fourth storage capacitor Cst4, and ΔV$_{gs}$ denotes a voltage level difference between the gate high voltage VGH and the gate low voltage VGL of the gate signal GS applied to the first gate line GL1.

In Equation 4, "{C_Cgs4/(C_Cgs4+C_Clc4+C_Cst4) *ΔV$_{gs}$}" represents a kick-back voltage (fourth kick-back voltage) with respect to the data voltage applied to the fourth sub-pixel electrode PE4. In an exemplary embodiment, due to the transition of the gate signal GS when the gate signal GS drops from the gate high voltage VGH to the gate low voltage VGL, the fourth sub-pixel voltage Vpx4 changes in the transition direction. In such an exemplary embodiment, the fourth kick-back voltage refers to a variation in the fourth sub-pixel voltage Vpx4. In an exemplary embodiment, the fourth sub-pixel voltage Vpx4 applied to the fourth sub-pixel electrode PE4 decreases by the fourth kick-back voltage. The fourth kick-back voltage and the second kick-back voltage ΔVkb2 may have the same magnitude.

The data voltage Vdata may be a positive voltage having a higher level than the level of the common voltage Vcom, or a negative voltage having a lower level than the level of the common voltage Vcom. The first kick-back voltage ΔVkb1 and the second kick-back voltage ΔVkb2 in FIG. 4 are generated in a direction in which levels of the positive data voltage and the negative data voltage decrease.

In an exemplary embodiment, when it is assumed that the first, second, third, and fourth liquid crystal capacitors Clc1, Clc2, Clc3, and Clc4 have the same capacitance value, and the first, second, third, and fourth storage capacitors Cst1, Cst2, Cst3, and Cst4 have the same capacitance value, the levels of the first, second, third, and fourth pixel voltages Vpx1, Vpx2, Vpx3, and Vpx4 may vary based on the first, second, third, and fourth kick-back voltages. In such an exemplary embodiment, as the magnitude of the kick-back voltage increases, the level of the pixel voltage decreases.

In an exemplary embodiment, the magnitudes of the first, second, third, and fourth kick-back voltages vary based on the capacitance values of the first, second, third, and fourth parasitic capacitors Cgs1, Cgs2, Cgs3, and Cgs4. In such an exemplary embodiment, as the capacitance value of the parasitic capacitor increases, the magnitude of the kick-back voltage increases. Accordingly, as the capacitance value of the parasitic capacitor increases, the level of the pixel voltage decreases.

In such an exemplary embodiment, as previously described, the capacitance values C_Cgs1, C_Cgs2, C_Cgs3, and C_Cgs4 of the first, second, third, and fourth parasitic capacitors Cgs1, Cgs2, Cgs3, and Cgs4 have a correlation as represented by Equation 5.

$$C\_Cgs1 = C\_Cgs4 < C\_Cgs2 = C\_Cgs3 \quad (5)$$

In such an exemplary embodiment, the first, second, third, and fourth sub-pixel voltages Vpx1, Vpx2, Vpx3, and Vpx4 have a correlation as represented by Equation 6.

$$Vpx1 = Vpx4 > Vpx2 = Vpx3 \quad (6)$$

As represented in Equation 6, although data voltages having the same level are respectively applied to the first, second, third, and fourth sub-pixels SPX1, SPX2, SPX3, and SPX4, the first sub-pixel voltage Vpx1 of the first sub-pixel SPX1 and the second sub-pixel voltage Vpx2 of the second sub-pixel SPX2 may have different levels from one another, and the third sub-pixel voltage Vpx3 of the third sub-pixel SPX3 and the fourth sub-pixel voltage Vpx4 of the fourth sub-pixel SPX4 may have different levels from one another. This is because the first parasitic capacitor Cgs1 of the first sub-pixel SPX1 and the second parasitic capacitor Cgs2 of the second sub-pixel SPX2 have different capacitance values from one another and the third parasitic capacitor Cgs3 of the third sub-pixel SPX3 and the fourth parasitic capacitor Cgs4 of the fourth sub-pixel SPX4 have different capacitance values from one another.

As illustrated in FIG. 4, in an exemplary embodiment, the level of the first sub-pixel voltage Vpx1 is higher than the level of the second sub-pixel voltage Vpx2. This is because the capacitance value of the first parasitic capacitor Cgs1 is smaller than the capacitance value of the second parasitic capacitor Cgs2. The level of the third sub-pixel voltage Vpx3 may be the same as the level of the second sub-pixel voltage Vpx2 of FIG. 4, and the level of the fourth sub-pixel voltage Vpx4 may be the same as the level of the first sub-pixel voltage Vpx1 of FIG. 4.

The kick-back voltage is generated in invariably the same direction, e.g., the direction in which the level of the data voltage decreases, irrespective of the polarity of the data voltage. Accordingly, when the data voltage Vdata applied to the pixel PX through the first data line DL1 is a positive voltage having a level higher than the level of the common voltage Vcom, the difference (first cell voltage: Vc1) between the level of the common voltage Vcom and the level of the first sub-pixel voltage Vpx1 having a positive polarity is greater than a difference (second cell voltage: Vc2) between the level of the common voltage Vcom and the level of the second sub-pixel voltage Vpx2 having a positive polarity.

On the other hand, when the data voltage Vdata applied to the pixel PX through the first data line DL1 is a negative voltage having a level lower than the level of the common voltage Vcom, a difference (first cell voltage: Vc1') between the level of the common voltage Vcom and a level of a first sub-pixel voltage Vpx1' having a negative polarity is less than a difference (second cell voltage: Vc2') between the level of the common voltage Vcom and a level of a second sub-pixel voltage Vpx2' having a negative polarity.

In such an exemplary embodiment, when the data voltage Vdata is a positive voltage as in a first frame period FR1, the magnitude of the first cell voltage Vc1 is greater than the magnitude of the second cell voltage Vc2. On the other hand, when the data voltage Vdata is a negative voltage as in a second frame period FR2, the magnitude of the second cell voltage Vc2' is greater than the magnitude of the first cell voltage Vc1'. In such an exemplary embodiment, the first cell voltage Vc1, the second cell voltage Vc2, the first cell voltage Vc1', and the second cell voltage Vc2' have absolute values.

In FIG. 4, ΔVkb1' denotes a first kick-back voltage with respect to a negative data voltage, and ΔVkb2' denotes a second kick-back voltage with respect to a negative data voltage. The level of the first sub-pixel voltage Vpx1' having a negative polarity applied to the first sub-pixel SPX1 decreases by the first kick-back voltage ΔVkb1', and the level of the second sub-pixel voltage Vpx2' having a negative polarity applied to the second sub-pixel SPX2 decreases by the second kick-back voltage ΔVkb2'.

Figure 5:
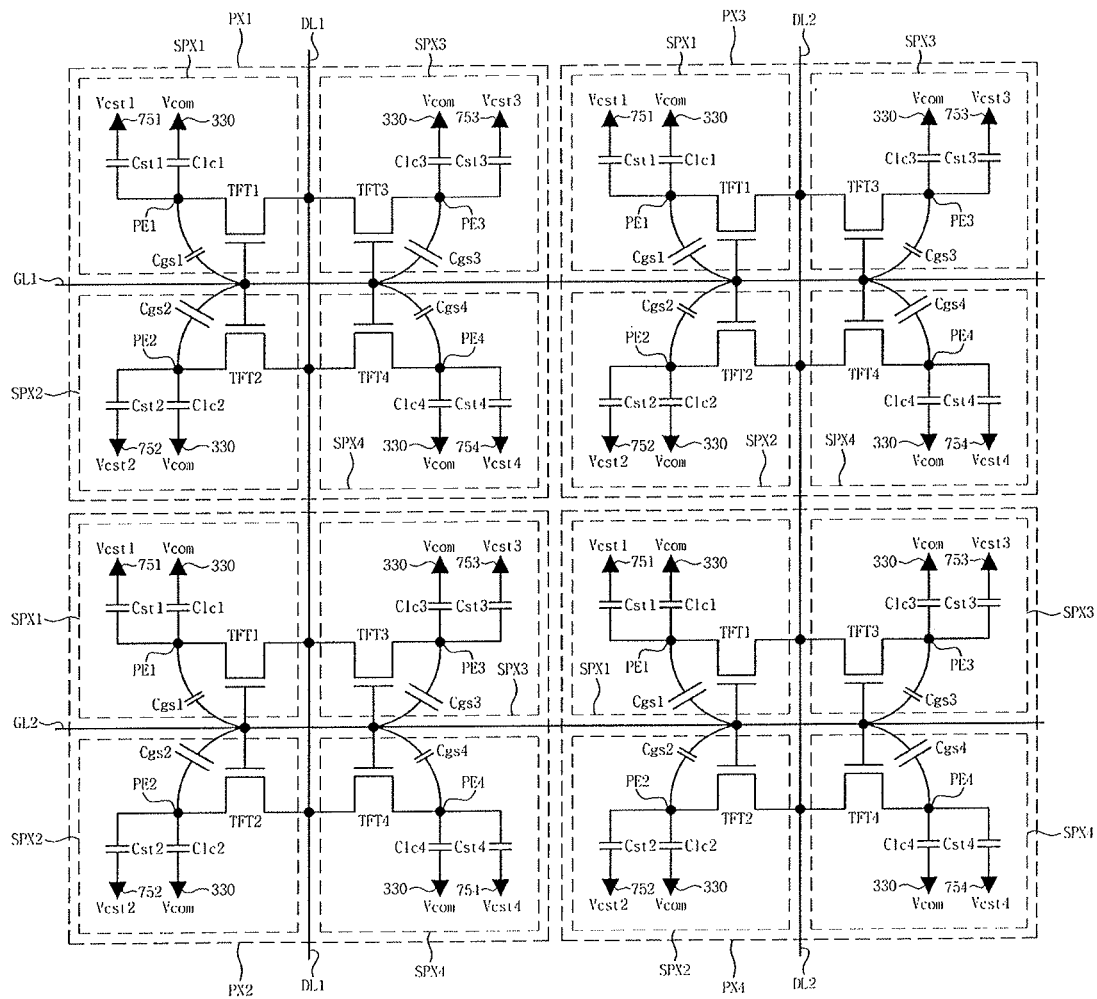
FIG. 5 illustrates an equivalent circuit diagram of the pixel of FIG. 2 and a plurality of pixels adjacent thereto.

FIG. 5 illustrates an example of an equivalent circuit of the pixel in FIG. 2 and a plurality of pixels adjacent thereto. Referring to FIG. 5, two of four pixels PX1, PX2, PX3, and PX4 connected to the first data line DL1 in common are defined as a first pixel PX1 and a second pixel PX2, respectively. The other two of the four pixels PX1, PX2, PX3, and PX4 connected to the second data line DL2 in common are defined as a third pixel PX3 and a fourth pixel PX4, respectively.

The first pixel PX1 corresponds to the pixel PX of FIG. 2. The first pixel PX1 has substantially the same structure as that of the pixel PX in FIG. 3. Thus, description of the first pixel PX1 will make reference to FIG. 3 and related descriptions.

The second pixel PX2 has substantially the same structure as that of the first pixel PX1. Thus, description of the second pixel PX2 will make reference to FIG. 3 and related descriptions. However, second pixel PX2 is connected to second gate line GL2.

The third pixel PX3 includes first, second, third, and fourth sub-pixels SPX1, SPX2, SPX3, and SPX4. The first sub-pixel SPX1 of the third pixel PX3 includes a first switching element TFT1, a first liquid crystal capacitor Clc1, a first storage capacitor Cst1, and a first parasitic capacitor Cgs1. The second sub-pixel SPX2 of the third pixel PX3 includes a second switching element TFT2, a second liquid crystal capacitor Clc2, a second storage capacitor Cst2, and a second parasitic capacitor Cgs2. The third sub-pixel SPX3 of the third pixel PX3 includes a third switching element TFT3, a third liquid crystal capacitor Clc3, a third storage capacitor Cst3, and a third parasitic capacitor Cgs3. The fourth sub-pixel SPX4 of the third pixel PX3 includes a fourth switching element TFT4, a fourth liquid crystal capacitor Clc4, a fourth storage capacitor Cst4, and a fourth parasitic capacitor Cgs4.

The first, second, third, and fourth switching elements TFT1, TFT2, TFT3, and TFT4, the first, second, third, and fourth liquid crystal capacitors Clc1, Clc2, Clc3, and Clc4, the first, second, third, and fourth storage capacitors Cst1, Cst2, Cst3, and Cst4, and the first, second, third, and fourth parasitic capacitors Cgs1, Cgs2, Cgs3, and Cgs4 of the third pixel PX3 are the same as the first, second, third, and fourth switching elements TFT1, TFT2, TFT3, and TFT4, the first, second, third, and fourth liquid crystal capacitors Clc1, Clc2, Clc3, and Clc4, the first, second, third, and fourth storage capacitors Cst1, Cst2, Cst3, and Cst4, and the first, second, third, and fourth parasitic capacitors Cgs1, Cgs2, Cgs3, and Cgs4 of the first pixel PX1. Thus, description of the components of the third pixel PX3 will make reference to corresponding ones of the components of the first pixel PX1.

However, a correlation among capacitance values of the first, second, third, and fourth parasitic capacitors Cgs1, Cgs2, Cgs3, and Cgs4 included in the third pixel PX3 is different from the correlation among the capacitance values of the first, second, third, and fourth parasitic capacitors Cgs1, Cgs2, Cgs3, and Cgs4 included in the first pixel PX1. The description pertaining thereto will be provided in detail hereinbelow.

At least two of the first, second, third, and fourth parasitic capacitors Cgs1, Cgs2, Cgs3, and Cgs4 of the third pixel PX3 may have different capacitance values from one another. For example, the capacitance value of the first parasitic capacitor Cgs1 of the third pixel PX3 may be different from the capacitance value of the second parasitic capacitor Cgs2 of the third pixel PX3, and the capacitance value of the third parasitic capacitor Cgs3 of the third pixel PX3 may be different from the capacitance value of the fourth parasitic capacitor Cgs4 of the third pixel PX3. In such an example, the capacitance value of the first parasitic capacitor Cgs1 of the third pixel PX3 may be greater than the capacitance value of the second parasitic capacitor Cgs2 of the third pixel PX3. In addition, the capacitance value of the fourth parasitic capacitor Cgs4 of the third pixel PX3 may be greater than the capacitance value of the third parasitic capacitor Cgs3 of the third pixel PX3.

On the other hand, the capacitance value of the first parasitic capacitor Cgs1 of the third pixel PX3 may be the same as the capacitance value of the fourth parasitic capacitor Cgs4 of the third pixel PX3. The capacitance value of the second parasitic capacitor Cgs2 of the third pixel PX3 may be the same as the capacitance value of the third parasitic capacitor Cgs3 of the third pixel PX3.

As such, the capacitance value of the second parasitic capacitor Cgs2 may be greater than the capacitance value of the first parasitic capacitor Cgs1 in the first pixel PX1, and the capacitance value of the first parasitic capacitor Cgs1 may be greater than the capacitance value of the second parasitic capacitor Cgs2 in the third pixel PX3. In addition, the capacitance value of the third parasitic capacitor Cgs3 may be greater than the capacitance value of the fourth parasitic capacitor Cgs4 in the first pixel PX1, and the capacitance value of the fourth parasitic capacitor Cgs4 may be greater than the capacitance value of the third parasitic capacitor Cgs3 in the third pixel PX3.

On the other hand, the capacitance value of the first parasitic capacitor Cgs1 of the first pixel PX1 may be the same as the capacitance value of the second parasitic capacitor Cgs2 of the third pixel PX3. The capacitance value of the second parasitic capacitor Cgs2 of the first pixel PX1 may be the same as the capacitance value of the first parasitic capacitor Cgs1 of the third pixel PX3. The capacitance value of the third parasitic capacitor Cgs3 of the first pixel PX1 may be the same as the capacitance value of the fourth parasitic capacitor Cgs4 of the third pixel PX3. The capacitance value of the fourth parasitic capacitor Cgs4 of the first pixel PX1 may be the same as the capacitance value of the third parasitic capacitor Cgs3 of the third pixel PX3.

The fourth pixel PX4 has substantially the same structure as that of the second pixel PX2. Thus, description of the fourth pixel PX4 will make reference to the descriptions of the second pixel PX2.

As such, pixels connected to different data lines may have different structures from one another. For example, each of pixels connected to odd-numbered data lines DL1, DL3, DL5, . . . , DLj−1 may have substantially the same structure as that of the first pixel PX1, and each of pixels connected to even-numbered data lines DL2, DL4, DL6, . . . , DLj may have substantially the same structure as that of the third pixel PX3.

Figure 6:
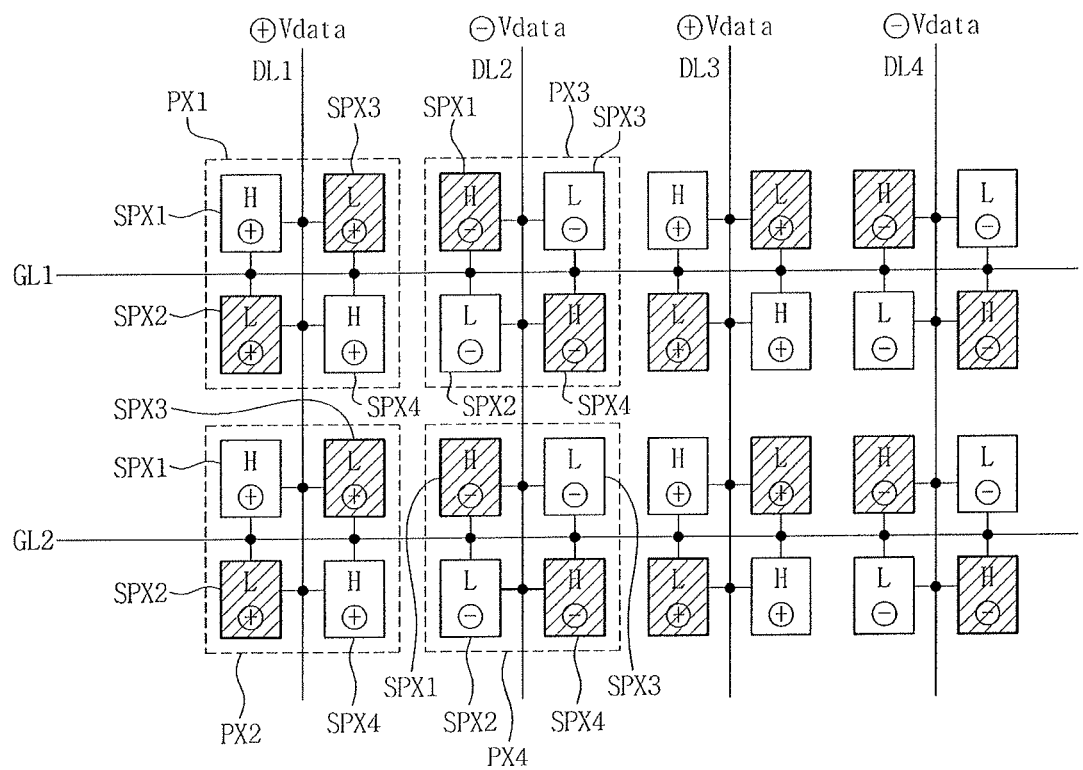
FIG. 6 illustrates an example of the pixel of FIG. 2 and a plurality of pixels adjacent thereto.

FIG. 6 illustrates an example of the pixel of FIG. 2 and a plurality of pixels adjacent thereto. Two of the pixels in FIG. 6 connected to the first data line DL1 in common are defined as a first pixel PX1 and a second pixel PX2, respectively. Two of the pixels in FIG. 6 connected to the second data line DL2 in common are defined as a third pixel PX3 and a fourth pixel PX4, respectively.

The hatched rectangles in FIG. 6 indicate sub-pixels including parasitic capacitors having relatively great capacitance values, respectively. The other rectangles, other than the hatched rectangles, indicate sub-pixels including parasitic capacitors having relatively small capacitance values, respectively. For example, among first, second, third, and fourth sub-pixels SPX1, SPX2, SPX3, and SPX4 in the first pixel PX1, the second sub-pixel SPX2 and the third sub-pixel SPX3 include parasitic capacitors having greater capacitance values than capacitance values of parasitic capacitors of the first sub-pixel SPX1 and the fourth sub-pixel SPX4.

The reference mark "H" in FIG. 6 indicates that a sub-pixel denoted by "H" generates a cell voltage having a relatively high level. The reference mark "L" in FIG. 6 indicates that a sub-pixel denoted by "L" generates a cell voltage having a relatively low level. The circled plus sign (⊕) in FIG. 6 indicates that a sub-pixel denoted by "⊕" receives a data voltage having a positive polarity (or a pixel voltage having a positive polarity). The circled minus sign (⊖) in FIG. 6 indicates that a sub-pixel denoted by "⊖" receives a data voltage having a negative polarity (or a pixel voltage having a negative polarity).

In an exemplary embodiment, a data voltage ⊕Vdata having a positive polarity applied to the first data line DL1 is applied to the first, second, third, and fourth sub-pixels SPX1, SPX2, SPX3, and SPX4 of the first pixel PX1. In such an exemplary embodiment, a cell voltage having a relatively high level is generated from the first sub-pixel SPX1 and the fourth sub-pixel SPX4 which have respective parasitic capacitors having relatively small capacitance values. On the other hand, a cell voltage having a relatively low level is generated from the second sub-pixel SPX2 and the third sub-pixel SPX3 which have respective parasitic capacitors having relatively great capacitance values. This is because the level of the second sub-pixel voltage Vpx2 having a positive polarity decreases by a greater amount than the level of the first sub-pixel voltage Vpx1 having a positive polarity, and the level of the third sub-pixel voltage Vpx3 having a positive polarity decreases by a greater amount than the level of the fourth sub-pixel voltage Vpx4, due to a capacitance value difference among the parasitic capacitors.

First, second, third, and fourth sub-pixels SPX1, SPX2, SPX3, and SPX4 in the second pixel PX2 operate in the same manner as the manner in which the first, second, third, and fourth sub-pixels SPX1, SPX2, SPX3, and SPX4 in the first pixel PX1 operate.

In an exemplary embodiment, a data voltage having a negative polarity applied to the second data line DL2 is applied to first, second, third, and fourth sub-pixels SPX1, SPX2, SPX3, and SPX4 of the third pixel PX3. In such an exemplary embodiment, a cell voltage having a relatively high level is generated from the first and fourth sub-pixels SPX1 and SPX4 which have respective parasitic capacitors having relatively large capacitance values. On the other hand, a cell voltage having a relatively low level is generated from the second sub-pixel SPX2 and the third sub-pixel SPX3 which have respective parasitic capacitors having relatively small capacitance values. This is because the level of a first sub-pixel voltage having a negative polarity decreases by a greater amount than the level of a second sub-pixel voltage having a negative polarity, and the level of a fourth sub-pixel voltage having a negative polarity decreases by a greater amount than the level of a third sub-pixel voltage having a negative polarity, due to a capacitance value difference among the parasitic capacitors.

First, second, third, and fourth sub-pixels SPX1, SPX2, SPX3, and SPX4 in the fourth pixel PX4 operate in the same manner as the first, second, third, and fourth sub-pixels SPX1, SPX2, SPX3, and SPX4 in the third pixel PX3.

When a data voltage having a negative polarity is applied to the first data line DL1, a cell voltage having a relatively high level is generated from the second sub-pixel SPX2 and the third sub-pixel SPX3 of the first pixel PX1, and a cell voltage having a relatively low level is generated from the first sub-pixel SPX1 and the fourth sub-pixel SPX4 of the first pixel PX1. Conversely, when a data voltage having a positive polarity is applied to the second data line DL2, a cell voltage having a relatively high level is generated from the second sub-pixel SPX2 and the third sub-pixel SPX3 of the third pixel PX3, and a cell voltage having a relatively low level is generated from the first sub-pixel SPX1 and the fourth sub-pixel SPX4 of the third pixel PX3.

Figure 7:
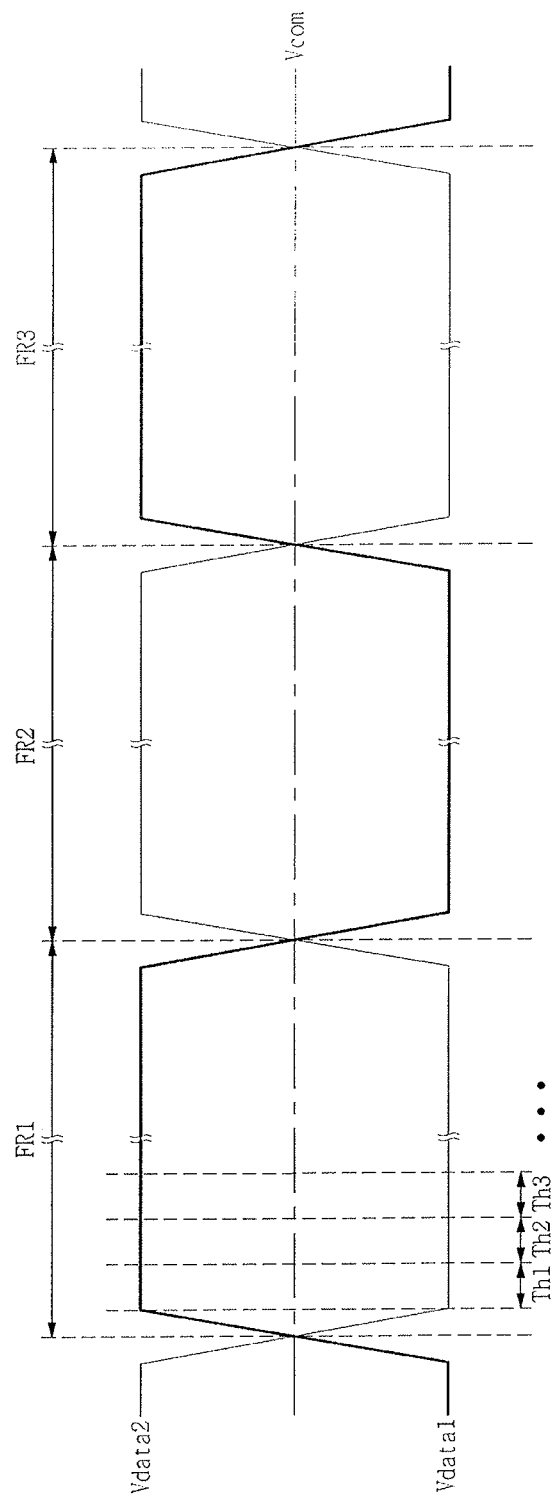
FIG. 7 illustrates an example of respective waveforms of data voltages applied to a first data line and a second data line of FIG. 6.

FIG. 7 illustrates an example of respective waveforms of data voltages applied to the first data line and the second data line of FIG. 6. In FIG. 7, Th2 denotes a second horizontal period in which the second gate line GL2 is driven and Th3 denotes a third horizontal period in which the third gate line GL3 is driven.

Referring to FIG. 7, in an exemplary embodiment, a first data voltage Vdata1 applied to the first data line DL1 has a polarity that varies for each frame period. In such an exemplary embodiment, for example, the first data voltage Vdata1 is maintained positive during an odd-numbered frame period (e.g., first and third frame periods FR1 and FR3), and the first data voltage Vdata1 is maintained negative during an even-numbered frame period (e.g., a second frame period FR2).

In an exemplary embodiment, a second data voltage Vdata2 applied to the second data line DL2 has a polarity that varies for each frame period. In such an exemplary embodiment, the first data voltage Vdata1 and the second data voltage Vdata2 have opposite polarities during the same frame period. For example, the second data voltage Vdata2 is maintained negative during the odd-numbered frame period (e.g., the first and third frame periods FR1 and FR3) in which the first data voltage Vdata1 is maintained positive, and the second data voltage Vdata2 is maintained positive during the even-numbered frame period (e.g., the second frame period FR2) in which the first data voltage Vdata1 is maintained negative.

The polarity of the data voltage applied to the odd-numbered data lines DL1, DL3, DL5, . . . , DLj−1 varies in the same manner as the manner in which the polarity of the first data voltage Vdata1 varies, and the polarity of the data voltage applied to the even-numbered data lines DL2, DL4, DL6, . . . , DLj varies in the same manner as the manner in which the polarity of the second data voltage Vdata2 varies.

The first data voltage Vdata1 includes positive data voltages having a high gray-scale level, and the second data voltage Vdata2 includes negative data voltages having a high gray-scale level. Accordingly, during the same horizontal period, the first data voltage Vdata1 and the second data voltage Vdata2 have substantially the same absolute value, and transition directions of the first data voltage Vdata1 and the second data voltage Vdata2 are opposite to one another.

As illustrated in FIG. 7, in an exemplary embodiment, during a first horizontal period Th1 in which the first gate line GL1 is driven, the first data voltage Vdata1 and the second data voltage Vdata2 have substantially the same magnitude while having opposite polarities. In such an exemplary embodiment, the first data voltage Vdata1 transitions upwards and the second data voltage Vdata2 transitions downwards.

In an exemplary embodiment, during the same first horizontal period Th1, data voltages applied to all the odd-numbered data lines DL1, DL3, DL5, . . . , DLj−1 transition in the same manner as the manner in which the first data voltage Vdata1 transitions, and data voltages applied to all the even-numbered data lines DL2, DL4, DL6, . . . , DLj transition in the same manner as the manner in which the second data voltage Vdata2 transitions. As such, due to the data voltages having substantially the same magnitude and transitioning in the opposite directions, ripples of the common voltage Vcom may be significantly reduced.

In such an exemplary embodiment, upward ripples of the common voltage Vcom generated by the first data voltage Vdata1 and the data voltages of the odd-numbered data lines DL1, DL3, DL5, . . . , DLj−1 are offset by downward ripples of the common voltage Vcom generated by the second data voltage Vdata2 and the data voltages of the even-numbered data lines DL2, DL4, DL6, . . . , DLj. Thus, the ripples of the common voltage Vcom may be significantly reduced. In such an exemplary embodiment, distortion of the common voltage Vcom may be significantly reduced. Accordingly, horizontal crosstalk may be significantly reduced.

Figure 8:
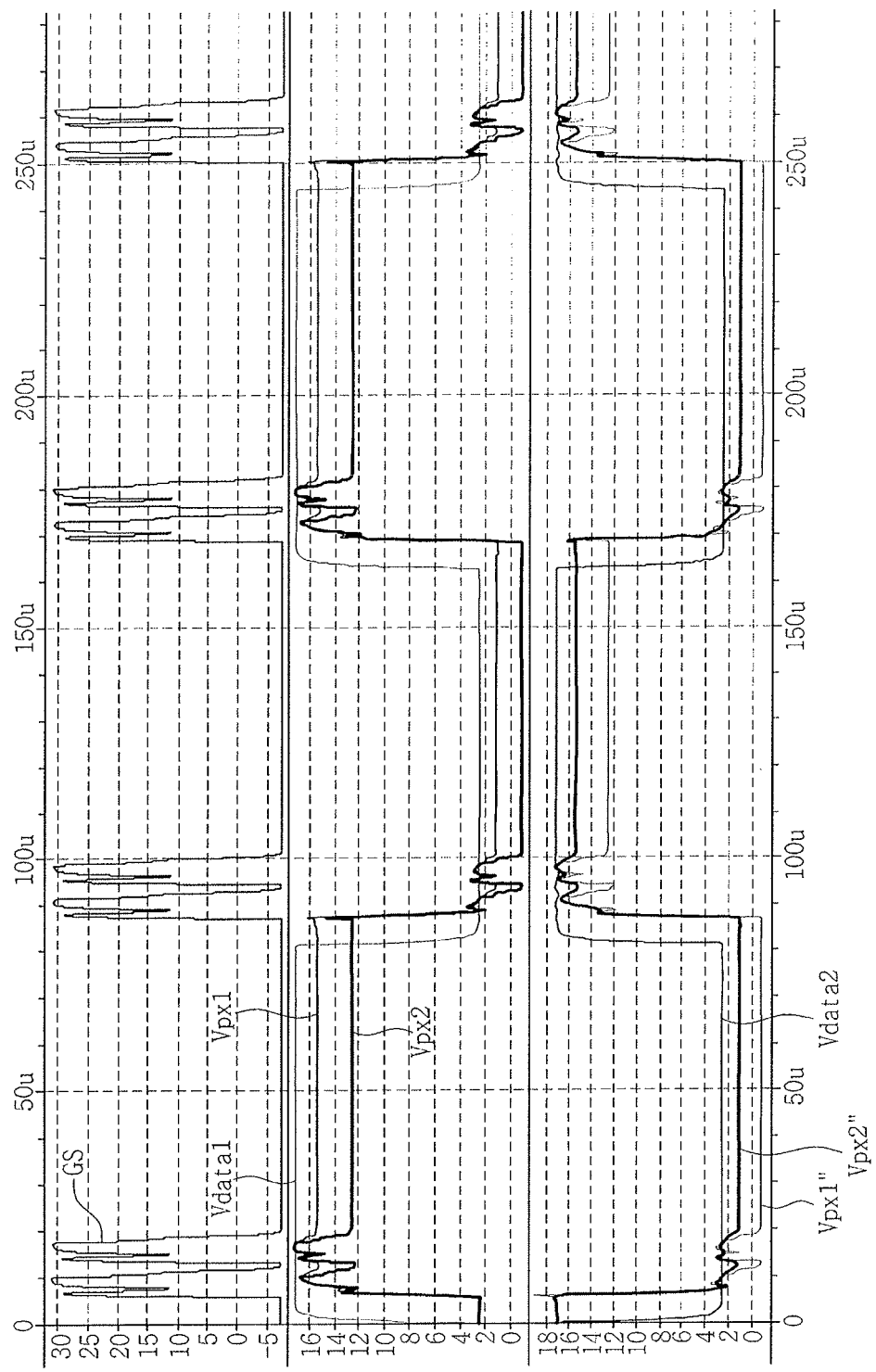
FIG. 8 illustrates an example of respective waveforms of a gate signal applied to a first gate line, a first data voltage applied to a first data line, a second data voltage applied to a second data line, a first sub-pixel voltage of a first pixel, a second sub-pixel voltage of the first pixel, a first sub-pixel voltage of a third pixel, and a second sub-pixel voltage of the third pixel of FIG. 6.

FIG. 8 illustrates an example of respective waveforms of the gate signal applied to the first gate line, the first data voltage applied to the first data line, the second data voltage applied to the second data line, the first sub-pixel voltage of the first pixel, the second sub-pixel voltage of the first pixel, the first sub-pixel voltage of the third pixel, and the second sub-pixel voltage of the third pixel of FIG. 6.

Referring to FIG. 8, in an exemplary embodiment, as a gate signal GS is applied to the first gate line GL1, a first data voltage Vdata1 having a positive polarity applied from the first data line DL1 is applied to the first pixel PX1, and a second data voltage Vdata2 having a negative polarity applied from the second data line DL2 is applied to the third pixel PX3.

Accordingly, a first sub-pixel voltage Vpx1 having a positive polarity is generated from the first sub-pixel SPX1 of the first pixel PX1, and a second sub-pixel voltage Vpx2 having a positive polarity is generated from the second sub-pixel SPX2 of the first pixel PX1. The level of the first sub-pixel voltage Vpx1 having a positive polarity is higher than a level of the second sub-pixel voltage Vpx2 having a positive polarity.

In such an exemplary embodiment, a first sub-pixel voltage Vpx1" having a negative polarity is generated from the first sub-pixel SPX1 of the third pixel PX3, and a second sub-pixel voltage Vpx2" having a negative polarity is generated from the second sub-pixel SPX2 of the third pixel PX3. The level of the first sub-pixel voltage Vpx1" having a negative polarity is lower than a level of the second sub-pixel voltage Vpx2" having a negative polarity.

Figure 9:
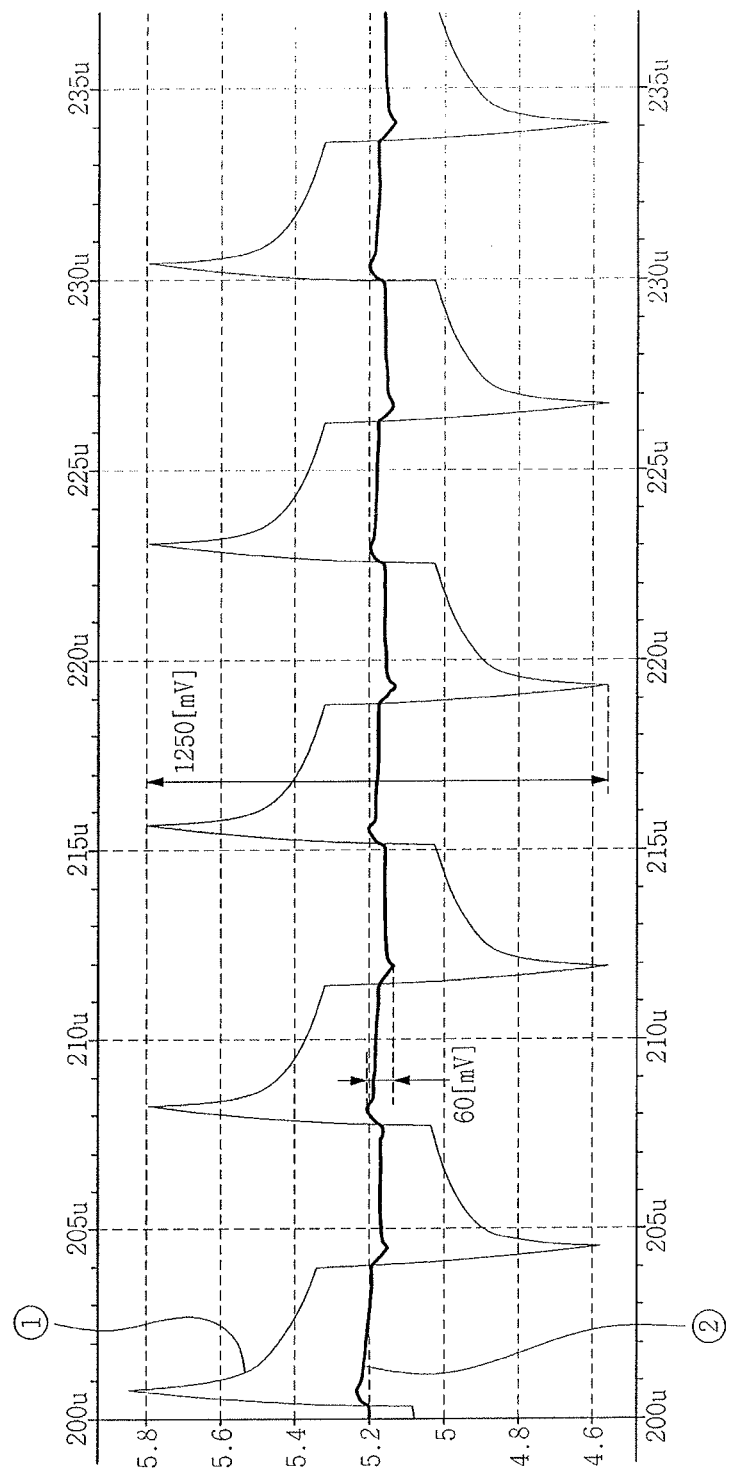
FIG. 9 illustrates an example of ripple reduction effects in a common voltage.

FIG. 9 illustrates an example of ripple reduction effects in the common voltage, and more specifically a common voltage ① measured from one type of LCD device and a common voltage ② measured from the LCD device according to an exemplary embodiment. The variation in common voltage ① is about 1250 [mV], and the variation in common voltage ② is about 60 [mV]. Accordingly, in this illustrative example, the LCD device according to an exemplary embodiment may generate the common voltage ② having a variation which is about one-twentieth of the variation in the conventional LCD device.

Figure 10:
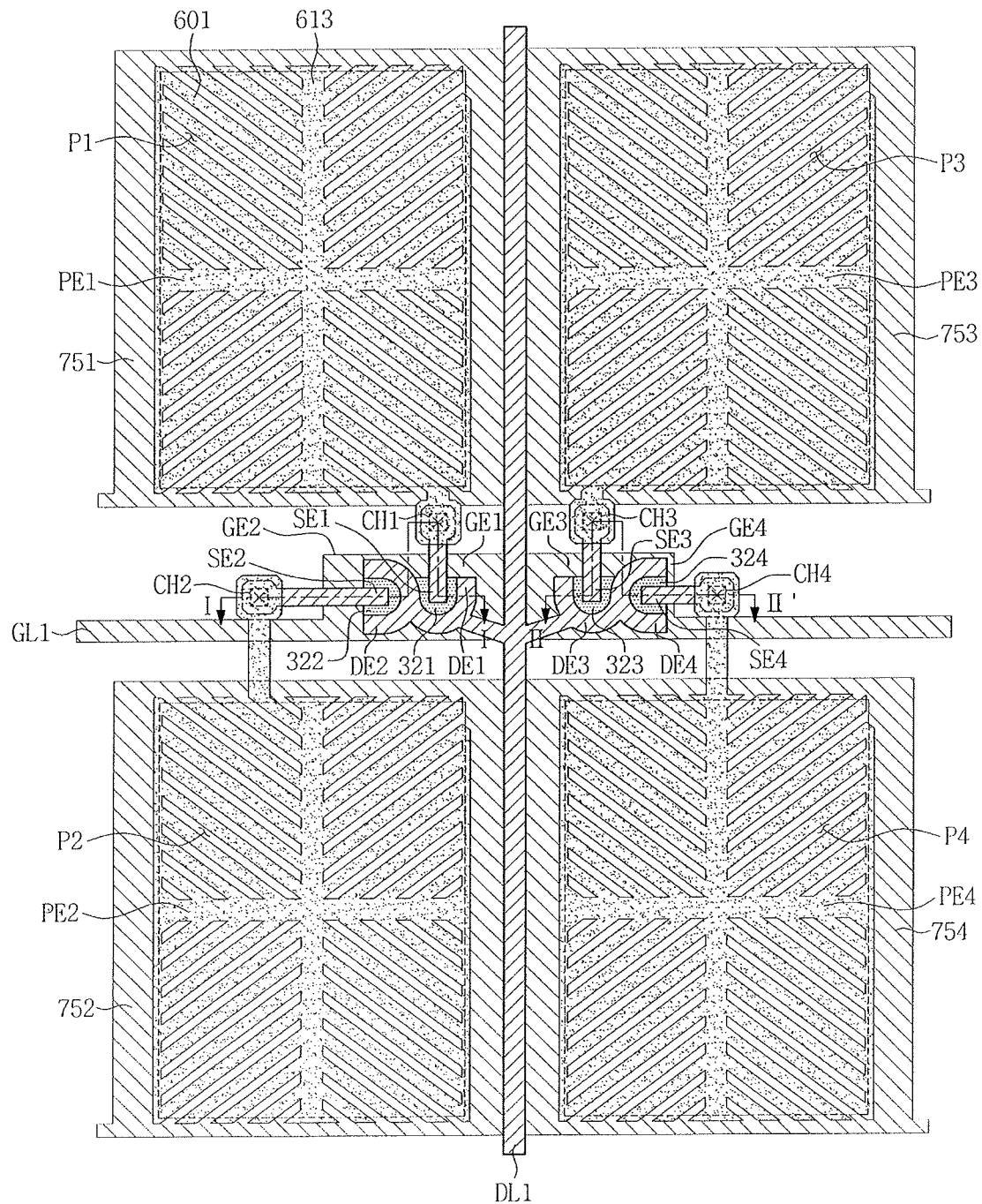
FIG. 10 illustrates a plan view of an LCD device having a pixel structure corresponding to the pixel circuit of FIG. 3 according to an exemplary embodiment.
Figure 11A:
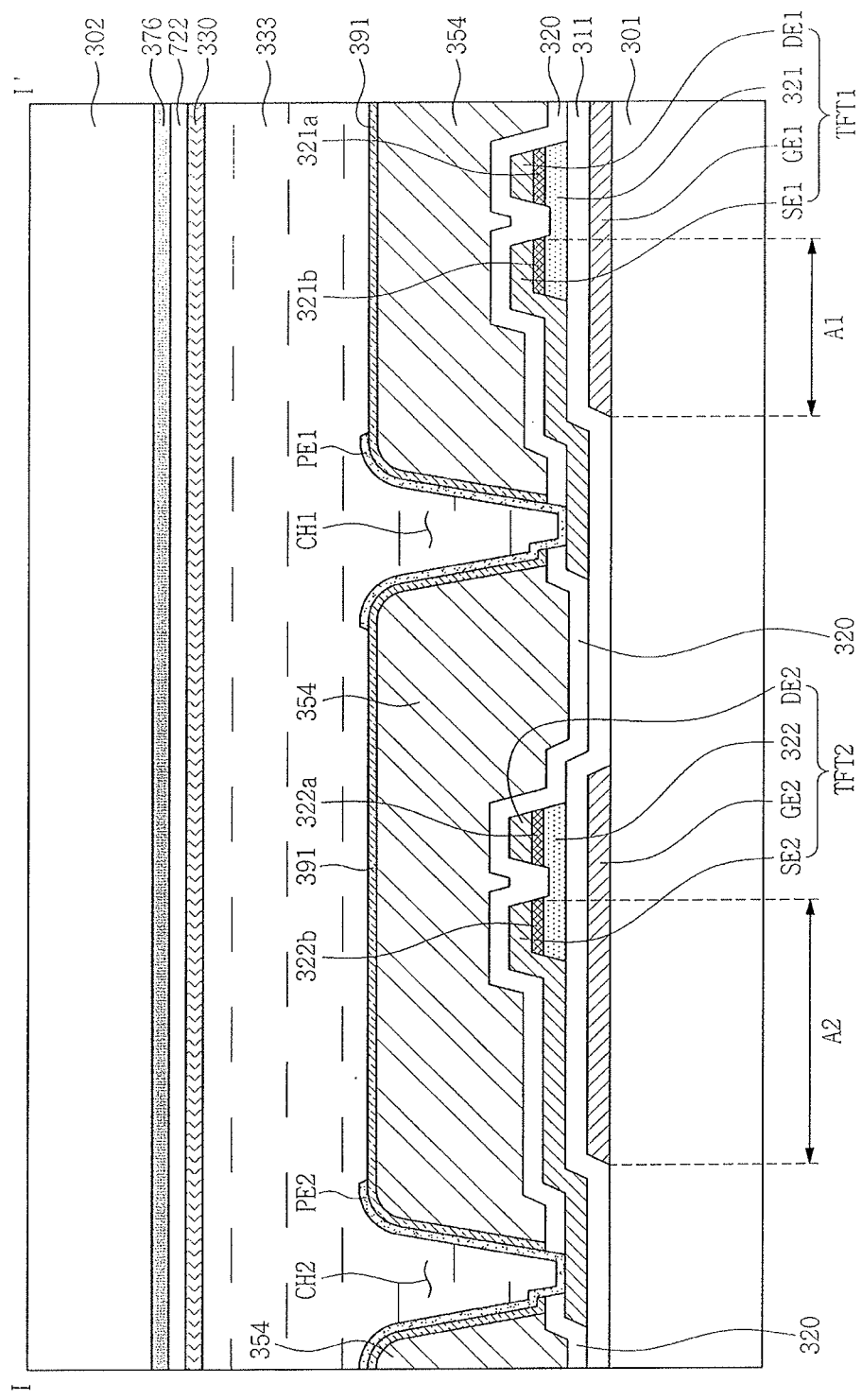
FIG. 11A illustrates a cross-sectional view taken along line I-I' of FIG. 10.
Figure 11B:
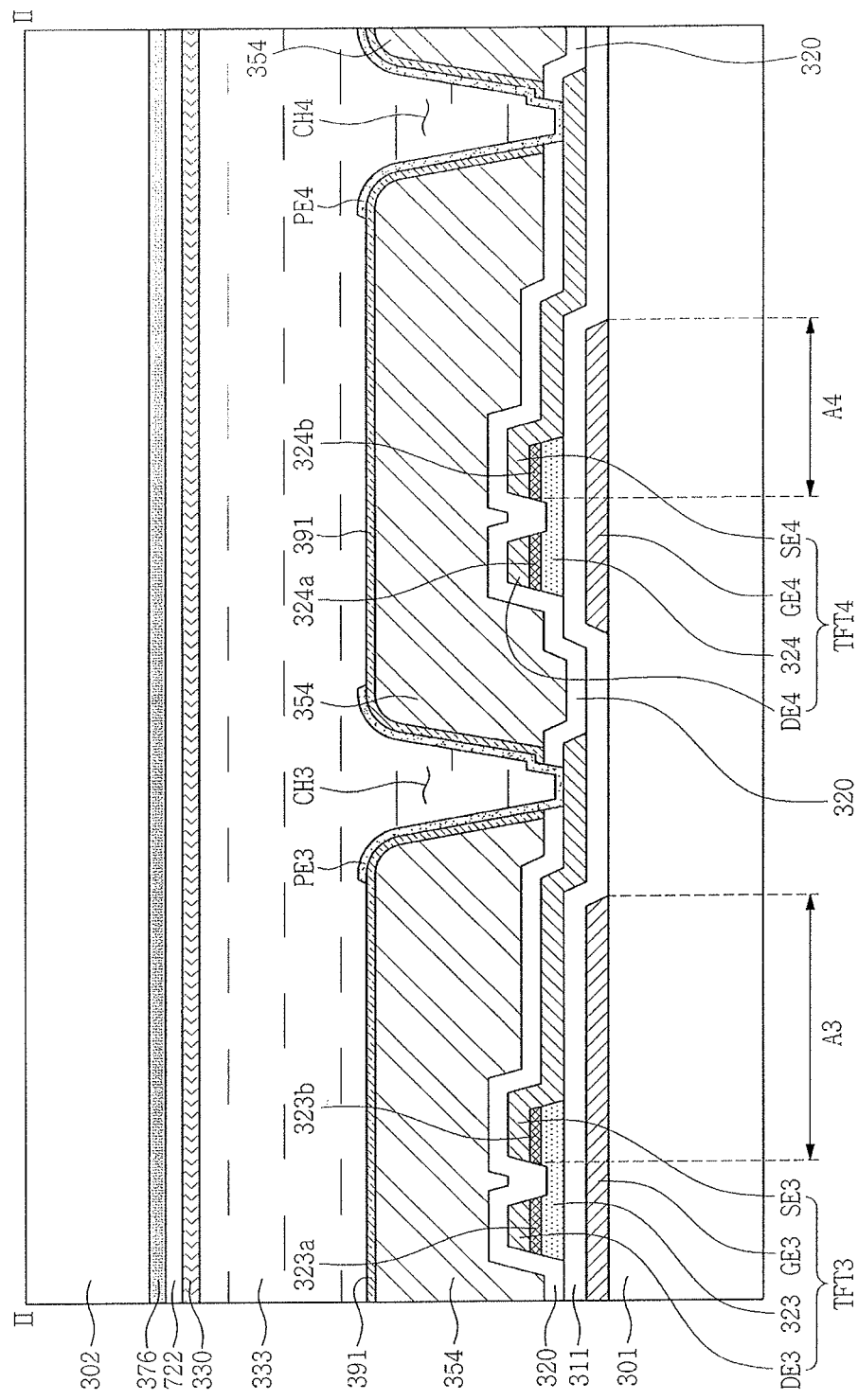
FIG. 11B illustrates a cross-sectional view taken along line II-II' of FIG. 10

FIG. 10 illustrates a plan view of another embodiment of an LCD device having a pixel structure corresponding to the pixel circuit of FIG. 3. FIG. 11A illustrates a cross-sectional view taken along line I-I' of FIG. 10. FIG. 11B illustrates a cross-sectional view taken along line II-II' of FIG. 10.

Referring to FIGS. 10, 11A, and 11B, in an exemplary embodiment, the LCD device includes a first substrate 301, a first gate line GL1, a first gate electrode GE1, a second gate electrode GE2, a first storage electrode 751, a second storage electrode 752, a third storage electrode 753, a fourth storage electrode 754, a gate insulating layer 311, a first semiconductor layer 321, a second semiconductor layer 322, a third semiconductor layer 323, a fourth semiconductor layer 324, a first ohmic contact layer 321a, a second ohmic contact layer 321b, a third ohmic contact layer 322a, a fourth ohmic contact layer 322b, a fifth ohmic contact layer 323a, a sixth ohmic contact layer 323b, a seventh ohmic contact layer 324a, an eighth ohmic contact layer 324b, a first data line DL1, a first drain electrode DE1, a first source electrode SE1, a second drain electrode DE2, a second source electrode SE2, a third drain electrode DE3, a third source electrode SE3, a fourth drain electrode DE4, a fourth source electrode SE4, a passivation layer 320, a capping layer 391, a color filter 354, a first sub-pixel electrode PE1, a second sub-pixel electrode PE2, a second substrate 302, a light blocking layer 376, an overcoat layer 722, a common electrode 330, and a liquid crystal layer 333.

In such an exemplary embodiment, the first ohmic contact layer 321a, the second ohmic contact layer 321b, the third ohmic contact layer 322a, the fourth ohmic contact layer 322b, the fifth ohmic contact layer 323a, the sixth ohmic contact layer 323b, the seventh ohmic contact layer 324a, and the eighth ohmic contact layer 324b may be removed from the LCD.

As illustrated in FIGS. 10 and 11A, a first switching element TFT1 includes the first gate electrode GE1, the first semiconductor layer 321, the first drain electrode DE1, and the first source electrode SE1.

As illustrated in FIGS. 10 and 11A, a second switching element TFT2 includes the second gate electrode GE2, the second semiconductor layer 322, the second drain electrode DE2, and the second source electrode SE2.

As illustrated in FIGS. 10 and 11B, a third switching element TFT3 includes a third gate electrode GE3, the third semiconductor layer 323, the third drain electrode DE3, and the third source electrode SE3.

As illustrated in FIGS. 10 and 11B, a fourth switching element TFT4 includes a fourth gate electrode GE4, the fourth semiconductor layer 324, the fourth drain electrode DE4, and the fourth source electrode SE4.

As illustrated in FIGS. 11A and 11B, in an exemplary embodiment, the first gate line GL1 is on the first substrate 301. In such an exemplary embodiment, as illustrated in FIG. 10, the first gate line GL1 is between a first sub-pixel area P1 and a second sub-pixel area P2 of the first substrate 301 and between a third sub-pixel area P3 and a fourth sub-pixel area P4 of the first substrate 301.

As illustrated in FIG. 10, the first gate line GL1 is connected to the first gate electrode GE1, the second gate electrode GE2, the third gate electrode GE3, and the fourth gate electrode GE4. The first gate line GL1, the first gate electrode GE1, the second gate electrode GE2, the third gate electrode GE3, and the fourth gate electrode GE4 may be unitary with one another. The first gate line GL1 may have a connecting portion (e.g., an end portion thereof) which has a greater width than the width of another portion thereof, to be connected to another layer or an external driving circuit.

In an exemplary embodiment, the first gate line GL1 may include at least one of an aluminum (Al)-based metal, e.g., Al or an Al alloy, a silver (Ag)-based metal, e.g., Ag or a Ag alloy, a copper (Cu)-based metal, e.g., Cu or a Cu alloy, and/or a molybdenum (Mo)-based metal, e.g., Mo or a Mo alloy. In another exemplary embodiment, the gate line GL may include one of chromium (Cr), tantalum (Ta), and titanium (Ti). In an exemplary embodiment, the gate line GL may have a multilayer structure including at least two conductive layers having different physical properties from one another.

As illustrated in FIG. 10, in an exemplary embodiment, the first, second, third, and fourth gate electrodes GE1, GE2, GE3, and GE4 may protrude from the first gate line GL1. In such an exemplary embodiment, the first, second, third, and fourth gate electrodes GE1, GE2, GE3, and GE4 may be a portion of the first gate line GL1. In an exemplary embodiment, the first, second, third, and fourth gate electrodes GE1, GE2, GE3, and GE4 may include substantially the same material and may have substantially the same structure (e.g., multilayer structure) as those of the first gate line GL1. In such an exemplary embodiment, the first, second, third, and fourth gate electrodes GE1, GE2, GE3, and GE4 and the first gate line GL1 may be simultaneously provided in the same process.

As illustrated in FIG. 10, in an exemplary embodiment, the first storage electrode 751 surrounds the first sub-pixel electrode PE1. In such an exemplary embodiment, the first storage electrode 751 may overlap an edge of the first sub-pixel electrode PE1. A first storage voltage Vcst1 is applied to the first storage electrode 751. The level of the first storage voltage Vcst1 may be the same as a level of the common voltage Vcom. The first storage electrode 751 may include substantially the same material and may have substantially the same structure (e.g., multilayer structure) as those of the first gate line GL1. In such an exemplary embodiment, the first storage electrode 751 and the first gate line GL1 may be simultaneously provided in the same process.

As illustrated in FIG. 10, in an exemplary embodiment, the second storage electrode 752 surrounds the second sub-pixel electrode PE2. In such an exemplary embodiment, the second storage electrode 752 may overlap an edge of the second sub-pixel electrode PE2. A second storage voltage Vcst2 is applied to the second storage electrode 752. The level of the second storage voltage Vcst2 may be the same as a level of the common voltage Vcom. The second storage electrode 752 may include substantially the same material and may have substantially the same structure (e.g., multilayer structure) as those of the first gate line GL1. In such an exemplary embodiment, the second storage electrode 752 and the first gate line GL1 may be simultaneously provided in the same process.

As illustrated in FIG. 10, in an exemplary embodiment, the third storage electrode 753 surrounds the third sub-pixel electrode PE3. In such an exemplary embodiment, the third storage electrode 753 may overlap an edge of the third sub-pixel electrode PE3. A third storage voltage Vcst3 is applied to the third storage electrode 753. The level of the third storage voltage Vcst3 may be the same as a level of the common voltage Vcom. The third storage electrode 753 may include substantially the same material and may have substantially the same structure (e.g., multilayer structure) as those of the first gate line GL1. In such an exemplary embodiment, the third storage electrode 753 and the first gate line GL1 may be simultaneously provided in the same process.

As illustrated in FIG. 10, in an exemplary embodiment, the fourth storage electrode 754 surrounds the fourth sub-pixel electrode PE4. In such an exemplary embodiment, the fourth storage electrode 754 may overlap an edge of the fourth sub-pixel electrode PE4. A fourth storage voltage Vcst4 is applied to the fourth storage electrode 754. The level of the fourth storage voltage Vcst4 may be the same as a level of the common voltage Vcom. The fourth storage electrode 754 may include substantially the same material and may have substantially the same structure (e.g., multilayer structure) as those of the first gate line GL1. In such an exemplary embodiment, the fourth storage electrode 754 and the first gate line GL1 may be simultaneously provided in the same process.

As illustrated in FIGS. 11A and 11B, in an exemplary embodiment, the gate insulating layer 311 is on the first gate line GL1, the first gate electrode GE1, the second gate electrode GE2, the third gate electrode GE3, the fourth gate electrode GE4, the first storage electrode 751, the second storage electrode 752, the third storage electrode 753, and the fourth storage electrode 754. In such an exemplary embodiment, the gate insulating layer 311 may be over substantially the entire surface of the first substrate 301 on which the first gate line GL1, the first gate electrode GE1, the second gate electrode GE2, the third gate electrode GE3, the fourth gate electrode GE4, the first storage electrode 751, the second storage electrode 752, the third storage electrode 753, and the fourth storage electrode 754 are disposed. The gate insulating layer 311 may include silicon nitride ($SiN_x$), silicon oxide ($SiO_x$), or the like. The gate insulating layer 311 may have a multilayer structure including at least two insulating layers having different physical properties from one another.

As illustrated in FIGS. 11A and 11B, the first data line DL1 is on the gate insulating layer 311. The first data line DL1 may have a connecting portion, for example, an end portion thereof, which has a greater width than a width of another portion thereof, to be connected to another layer or an external driving circuit.

The first data line DL1 intersects the first gate line GL1. The first data line DL1 may have a less line width at a portion thereof that intersects the first gate line GL1 than a line width of another portion thereof. Accordingly, a parasitic capacitance value between the first data line DL1 and the first gate line GL1 may be reduced.

In an exemplary embodiment, the first data line DL1 may include a refractory metal, e.g., molybdenum (Mo), chromium (Cr), tantalum (Ta), and titanium (Ti), or an alloy thereof. In an exemplary embodiment, the first data line DL1 may have a multilayer structure including a refractory metal layer and a low-resistance conductive layer. Examples of the multilayer structure may include a double-layer structure including a Cr or Mo (alloy) lower layer and an Al (alloy) upper layer, and a triple-layer structure including a Mo (alloy) lower layer, an Al (alloy) intermediate layer, and a Mo (alloy) upper layer. Further, the first data line DL1 may include any suitable metal or conductor, in addition to, or instead of, the aforementioned materials.

As illustrated in FIG. 11A, in an exemplary embodiment, the first semiconductor layer 321 is on the gate insulating layer 311. In such an exemplary embodiment, the first semiconductor layer 321 overlaps at least a portion of the first gate electrode GE1. The first semiconductor layer 321 may include, e.g., amorphous silicon, polycrystalline silicon.

As illustrated in FIG. 11A, in an exemplary embodiment, the first and second ohmic contact layers 321a and 321b are on the first semiconductor layer 321. The first and second ohmic contact layers 321a and 321b oppose one another with a channel region of the first semiconductor layer 321 therebetween. At least one of the first and second ohmic contact layers 321a and 321b may include silicide, or n+ hydrogenated amorphous silicon doped with n-type impurities, e.g., phosphorus (P) or phosphine ($PH_3$), at high concentration.

As illustrated in FIG. 11A, in an exemplary embodiment, the second semiconductor layer 322 is on the gate insulating layer 311. In such an exemplary embodiment, the second semiconductor layer 322 overlaps at least a portion of the second gate electrode GE2. The second semiconductor layer 322 may include, e.g., amorphous silicon or polycrystalline silicon. The second semiconductor layer 322 and the first semiconductor layer 321 may be connected to one another.

As illustrated in FIG. 11A, in an exemplary embodiment, the third and fourth ohmic contact layers 322a and 322b are on the second semiconductor layer 322. The third and fourth ohmic contact layers 322a and 322b oppose one another with a channel region of the second semiconductor layer 322 therebetween. At least one of the third and fourth ohmic contact layers 322a and 322b may include silicide, or n+ hydrogenated amorphous silicon doped with n-type impurities, e.g., phosphorus (P) or phosphine ($PH_3$), at high concentration.

As illustrated in FIG. 11B, in an exemplary embodiment, the third semiconductor layer 323 is on the gate insulating layer 311. In such an exemplary embodiment, the third semiconductor layer 323 overlaps at least a portion of the third gate electrode GE3. The third semiconductor layer 323 may include, e.g., amorphous silicon or polycrystalline silicon.

As illustrated in FIG. 11B, in an exemplary embodiment, the fifth and sixth ohmic contact layers 323a and 323b are on the third semiconductor layer 323. The fifth and sixth ohmic contact layers 323a and 323b oppose one another with a channel region of the third semiconductor layer 323 therebetween. At least one of the fifth or sixth ohmic contact layers 323a and 323b may include, for example, silicide, or n+ hydrogenated amorphous silicon doped with n-type impurities, e.g., phosphorus (P) or phosphine ($PH_3$), at high concentration.

As illustrated in FIG. 11B, in an exemplary embodiment, the fourth semiconductor layer 324 is on the gate insulating layer 311. In such an exemplary embodiment, the fourth semiconductor layer 324 overlaps at least a portion of the fourth gate electrode GE4. The fourth semiconductor layer 324 may include, e.g., amorphous silicon or polycrystalline silicon. The fourth semiconductor layer 324 and the third semiconductor layer 323 may be connected to one another.

As illustrated in FIG. 11B, in an exemplary embodiment, the seventh and eighth ohmic contact layers 324a and 324b are on the fourth semiconductor layer 324. The seventh and eighth ohmic contact layers 324a and 324b oppose one another with a channel region of the fourth semiconductor layer 324 therebetween. At least one of the seventh and eighth ohmic contact layers 324a and 324b may include, for example, silicide or n+ hydrogenated amorphous silicon doped with n-type impurities, e.g., phosphorus (P) or phosphine ($PH_3$), at high concentration.

As illustrated in FIG. 11A, in an exemplary embodiment, the first drain electrode DE1 is on the first ohmic contact layer 321a. The first drain electrode DE1 is on the gate insulating layer 311. As illustrated in FIG. 10, in an exemplary embodiment, the first drain electrode DE1 may protrude from the first data line DL1. The first drain electrode DE1 may be a portion of the first data line DL1. In such an exemplary embodiment, at least a portion of the first drain electrode DE1 overlaps the first semiconductor layer 321 and the first gate electrode GE1. The first drain electrode DE1 may have, for example, one of an I-like shape, a C-like shape, and a U-like shape.

FIG. 10 illustrates the first drain electrode DE1 as having a U-like shape. The first drain electrode DE1 may include substantially the same material and may have substantially the same structure (e.g., multilayer structure) as those of the first data line DL1. In such an exemplary embodiment, the first drain electrode DE1 and the first data line DL1 may be simultaneously provided in the same process.

As illustrated in FIG. 11A, in an exemplary embodiment, the first source electrode SE1 is on the second ohmic contact layer 321b and the gate insulating layer 311. In an exemplary embodiment, at least a portion of the first source electrode SE1 overlaps the first semiconductor layer 321 and the first gate electrode GE1. The first source electrode SE1 is connected to the first sub-pixel electrode PE1. The first source electrode SE1 may include substantially the same material and may have substantially the same structure (e.g., multilayer structure) as those of the first data line DL1. In such an exemplary embodiment, the first source electrode SE1 and the first data line DL1 may be simultaneously provided in the same process.

As illustrated in FIG. 11A, in an exemplary embodiment, the second drain electrode DE2 is on the third ohmic contact layer 322a. The second drain electrode DE2 is on the gate insulating layer 311. As illustrated in FIG. 10, in an exemplary embodiment, the second drain electrode DE2 may protrude from the first drain electrode DE1. The second drain electrode DE2 may be a portion of the first drain electrode DE1. In such an exemplary embodiment, at least a portion of the second drain electrode DE2 overlaps the second semiconductor layer 322 and the second gate electrode GE2. The second drain electrode DE2 may have, for example, one of an I-like shape, a C-like shape, and a U-like shape.

In an exemplary embodiment, FIG. 10 illustrates the second drain electrode DE2 as having a U-like shape. The second drain electrode DE2 may include substantially the same material and may have substantially the same structure (e.g., multilayer structure) as those of the first data line DL1. In such an exemplary embodiment, the second drain electrode DE2 and the first data line DL1 may be simultaneously provided in the same process.

As illustrated in FIG. 11A, in an exemplary embodiment, the second source electrode SE2 is on the fourth ohmic contact layer 322b and the gate insulating layer 311. In such an exemplary embodiment, at least a portion of the second source electrode SE2 overlaps the second semiconductor layer 322 and the second gate electrode GE2. The second source electrode SE2 is connected to the second sub-pixel electrode PE2. The second source electrode SE2 may include substantially the same material and may have substantially the same structure (e.g., multilayer structure) as those of the first data line DL1. In such an exemplary embodiment, the second source electrode SE2 and the first data line DL1 may be simultaneously provided in the same process.

As illustrated in FIG. 11B, in an exemplary embodiment, the third drain electrode DE3 is on the fifth ohmic contact layer 323a. The third drain electrode DE3 is on the gate insulating layer 311. As illustrated in FIG. 10, in an exemplary embodiment, the third drain electrode DE3 may protrude from the first data line DL1. The third drain electrode DE3 may be a portion of the first data line DL1. In such an exemplary embodiment, at least a portion of the third drain electrode DE3 overlaps the third semiconductor layer 323 and the third gate electrode GE3. The third drain electrode DE3 may have, for example, one of an I-like shape, a C-like shape, and a U-like shape.

In an exemplary embodiment, FIG. 10 illustrates the third drain electrode DE3 as having a U-like shape. The third drain electrode DE3 may include substantially the same material and may have substantially the same structure (e.g., multilayer structure) as those of the first data line DL1. In such an exemplary embodiment, the third drain electrode DE3 and the first data line DL1 may be simultaneously provided in the same process.

As illustrated in FIG. 11B, in an exemplary embodiment, the third source electrode SE3 is on the sixth ohmic contact layer 323b and the gate insulating layer 311. In such an exemplary embodiment, at least a portion of the third source electrode SE3 overlaps the third semiconductor layer 323 and the third gate electrode GE3. The third source electrode SE3 is connected to the third sub-pixel electrode PE3. The third source electrode SE3 may include substantially the same material and may have substantially the same structure (e.g., multilayer structure) as those of the first data line DL1. In such an exemplary embodiment, the third source electrode SE3 and the first data line DL1 may be simultaneously provided in the same process.

As illustrated in FIG. 11B, in an exemplary embodiment, the fourth drain electrode DE4 is on the seventh ohmic contact layer 324a. The fourth drain electrode DE4 is on the gate insulating layer 311. As illustrated in FIG. 10, in an exemplary embodiment, the fourth drain electrode DE4 may protrude from the third drain electrode DE3. The fourth drain electrode DE4 may be a portion of the third drain electrode DE3. In such an exemplary embodiment, at least a portion of the fourth drain electrode DE4 overlaps the fourth semiconductor layer 324 and the fourth gate electrode GE4. The fourth drain electrode DE4 may have, for example, one of an I-like shape, a C-like shape, and a U-like shape.

In an exemplary embodiment, FIG. 10 illustrates the fourth drain electrode DE4 as having a U-like shape. The fourth drain electrode DE4 may include substantially the same material and may have substantially the same structure (e.g., multilayer structure) as those of the first data line DL1. In such an exemplary embodiment, the fourth drain electrode DE4 and the first data line DL1 may be simultaneously provided in the same process.

As illustrated in FIG. 11B, in an exemplary embodiment, the fourth source electrode SE4 is on the eighth ohmic contact layer 324b and the gate insulating layer 311. In such an exemplary embodiment, at least a portion of the fourth source electrode SE4 overlaps the fourth semiconductor layer 324 and the fourth gate electrode GE4. The fourth source electrode SE4 is connected to the fourth sub-pixel electrode PE4. The fourth source electrode SE4 may include substantially the same material and may have substantially the same structure (e.g., multilayer structure) as those of the first data line DL1. In such an exemplary embodiment, the fourth source electrode SE4 and the first data line DL1 may be simultaneously provided in the same process.

In an exemplary embodiment, respective ones of the semiconductor layers and the ohmic contact layers may be between the gate insulating layer 311 and the first data line DL1, between the first drain electrode DE1 and the gate insulating layer 311, between the first source electrode SE1 and the gate insulating layer 311, between the second drain electrode DE2 and the gate insulating layer 311, between the second source electrode SE2 and the gate insulating layer 311, between the third drain electrode DE3 and the gate insulating layer 311, between the third source electrode SE3 and the gate insulating layer 311, between the fourth drain electrode DE4 and the gate insulating layer 311, and between the fourth source electrode SE4 and the gate insulating layer 311. In such an exemplary embodiment, the first, second, third, and fourth semiconductor layers 321, 322, 323, and 324 and the respective semiconductor layers may be unitary with one another, and the first, second, third, fourth, fifth, sixth, seventh, and eighth ohmic contact layers 321a, 321b, 322a, 322b, 323a, 323b, 324a, and 324b. The respective ohmic contact layers may be unitary (e.g., integrally formed) with one another.

As illustrated in FIGS. 11A and 11B, in an exemplary embodiment, the passivation layer 320 is on the first data line DL1, the first drain electrode DE1, the second drain electrode DE2, the third drain electrode DE3, the fourth drain electrode DE4, the first source electrode SE1, the second source electrode SE2, the third source electrode SE3, and the fourth source electrode SE4. In such an exemplary embodiment, the passivation layer 320 may be over substantially the entire surface of the first substrate 301 on which the first data line DL1, the first drain electrode DE1, the second drain electrode DE2, the third drain electrode DE3, the fourth drain electrode DE4, the first source electrode SE1, the second source electrode SE2, the third source electrode SE3, and the fourth source electrode SE4 are disposed. First, second, third, and fourth lower contact holes may be defined through the passivation layer 320. The first source electrode SE1 is exposed through the first lower contact hole, the second source electrode SE2 is exposed through the second lower contact hole, the third source electrode SE3 is exposed through the third lower contact hole, and the fourth source electrode SE4 is exposed through the fourth lower contact hole.

In an exemplary embodiment, the passivation layer 320 may include an inorganic insulating material, e.g., $SiN_x$ or $SiO_x$. In such an exemplary embodiment, the inorganic insulating material may have photosensitivity and a dielectric constant of about 4.0. In another exemplary embodiment, the passivation layer 320 may have a double-layer structure including a lower inorganic layer and an upper organic layer. The double-layer structure of the passivation layer 320 may substantially reduce or effectively prevent damage to an exposed portion of the first and second semiconductor layers 321 and 322, and may allow for a relatively high insulating property. In an exemplary embodiment, the passivation layer 320 may have a thickness of greater than or equal to about 5,000 angstroms (Å), for example, in a range of about 6,000 Å to about 8,000 Å.

As illustrated in FIGS. 11A and 11B, in an exemplary embodiment, the color filter 354 is on the passivation layer 320. The color filters 354 are in the first sub-pixel area P1, the second sub-pixel area P2, the third sub-pixel area P3, and the fourth sub-pixel area P4, respectively. In such an exemplary embodiment, an edge of the color filter 354 is on the first gate line GL1, the first switching element TFT1, the second switching element TFT2, the third switching element TFT3, the fourth switching element TFT4, and the first data line DL1. However, the color filter 354 may be absent at positions corresponding to first, second, third, and fourth contact holes CH1, CH2, CH3, and CH4. In an exemplary embodiment, an edge of one of the color filters 354 may overlap an edge of an adjacent one of the color filters 354.

In an exemplary embodiment, respective ones of the color filters 354 in the first sub-pixel area P1, the second sub-pixel area P2, the third sub-pixel area P3, and the fourth sub-pixel area P4 in one pixel have the same color. In such an exemplary embodiment, the color filters 354 having a red (R) color may be in the first sub-pixel area P1, the second sub-pixel area P2, the third sub-pixel area P3, and the fourth sub-pixel area P4, respectively.

The color filter 354 may include, for example, a photosensitive organic material.

As illustrated in FIGS. 11A and 11B, in an exemplary embodiment, the capping layer 391 is on the color filter 354. The capping layer 391 may prevent impurities generated from the color filter 354 from being diffused to the liquid crystal layer 333. First, second, third, and fourth upper contact holes are defined through the capping layer 391. The first upper contact hole is positioned over the first lower contact hole through which the first source electrode SE1 is exposed. The first upper contact hole and the first lower contact hole are connected to one another to define the first contact hole CH1. The second upper contact hole is positioned over the second lower contact hole through which the second source electrode SE2 is exposed. The second upper contact hole and the second lower contact hole are connected to one another to define the second contact hole CH2. The third upper contact hole is positioned over the third lower contact hole through which the third source electrode SE3 is exposed. The third upper contact hole and the third lower contact hole are connected to one another to define the third contact hole CH3. The fourth upper contact hole is positioned over the fourth lower contact hole through which the fourth source electrode SE4 is exposed. The fourth upper contact hole and the fourth lower contact hole are connected to one another to define the fourth contact hole CH4. The capping layer 391 may include $SiN_x$, $SiO_x$, or the like.

As illustrated in FIG. 10, in an exemplary embodiment, the first sub-pixel electrode PE1 is in the first sub-pixel area P1. In such an exemplary embodiment, the first sub-pixel electrode PE1 is on the capping layer 391. The first sub-pixel electrode PE1 is connected to the first source electrode SE1 through the first contact hole CH1.

As illustrated in FIG. 10, in an exemplary embodiment, the first sub-pixel electrode PE1 includes a cross-shaped stem electrode 613, and a plurality of branch electrodes 601 branching out from the stem electrode 613 in a plurality of directions. The stem electrode 613 and the branch electrodes 601 may be unitary (e.g., integrally formed) with one another.

In an exemplary embodiment, the first sub-pixel electrode PE1 may include a transparent conductive material, e.g., indium-tin oxide ("ITO") or indium-zinc oxide ("IZO"). In such an exemplary embodiment, for example, ITO may include a polycrystalline or monocrystalline material, and IZO may include a polycrystalline or monocrystalline material. In another exemplary embodiment, IZO may include an amorphous material.

As illustrated in FIG. 10, in an exemplary embodiment, the second sub-pixel electrode PE2 is in the second sub-pixel area P2. In such an exemplary embodiment, the second sub-pixel electrode PE2 is on the capping layer 391. The second sub-pixel electrode PE2 is connected to the second source electrode SE2 through the second contact hole CH2. The second sub-pixel electrode PE2 and the first sub-pixel electrode PE1 may include the same material. In such an exemplary embodiment, the second sub-pixel electrode PE2 and the first sub-pixel electrode PE1 may be simultaneously manufactured in the same process.

The second sub-pixel electrode PE2 and the first sub-pixel electrode PE1 may have substantially the same shape.

As illustrated in FIG. 10, in an exemplary embodiment, the third sub-pixel electrode PE3 is in the third sub-pixel area P3. In such an exemplary embodiment, the third sub-pixel electrode PE3 is on the capping layer 391. The third sub-pixel electrode PE3 is connected to the third source electrode SE3 through the third contact hole CH3. The third sub-pixel electrode PE3 and the first sub-pixel electrode PE1 may include the same material. In such an exemplary embodiment, the third sub-pixel electrode PE3 and the first sub-pixel electrode PE1 may be simultaneously manufactured in the same process.

The third sub-pixel electrode PE3 and the first sub-pixel electrode PE1 may have substantially the same shape.

As illustrated in FIG. 10, in an exemplary embodiment, the fourth sub-pixel electrode PE4 is in the fourth sub-pixel area P4. In such an exemplary embodiment, the fourth sub-pixel electrode PE4 is on the capping layer 391. The fourth sub-pixel electrode PE4 is connected to the fourth source electrode SE4 through the fourth contact hole CH4. The fourth sub-pixel electrode PE4 and the first sub-pixel electrode PE1 may include the same material. In such an exemplary embodiment, the fourth sub-pixel electrode PE4 and the first sub-pixel electrode PE1 may be simultaneously manufactured in the same process.

The fourth sub-pixel electrode PE4 and the first sub-pixel electrode PE1 may have substantially the same shape.

As illustrated in FIGS. 11A and 11B, in an exemplary embodiment, the light blocking layer 376 is on the second substrate 302. The light blocking layer 376 is in an area other than the first, second, third, and fourth sub-pixel areas P1, P2, P3, and P4. In another exemplary embodiment, the light blocking layer 376 may be on the first substrate 301.

In an exemplary embodiment, the overcoat layer 722 is on the light blocking layer 376. In such an exemplary embodiment, the overcoat layer 722 may be over substantially the entire surface of the second substrate 302 on which the light blocking layer 376 is disposed. The overcoat layer 722 may effectively remove a step difference among components between the overcoat layer 722 and the second substrate 302, e.g., the components of the second substrate 302, e.g., the light blocking layer 376. In another exemplary embodiment, the overcoat layer 722 may be omitted.

In an exemplary embodiment, the common electrode 330 is on the overcoat layer 722. In such an exemplary embodiment, the common electrode 330 may be over substantially the entire surface of the second substrate 302 on which the overcoat layer 722 is disposed. In another exemplary embodiment, the common electrode 330 may be on portions of the overcoat layer 722 that correspond to the first, second, third, and fourth sub-pixel areas P1, P2, P3, and P4. A common voltage Vcom is applied to the common electrode 330.

In an exemplary embodiment, the LCD device may include a first polarizer and a second polarizer. When surfaces of the first substrate 301 and the second substrate 302 opposing one another are defined as upper surfaces (e.g., inner surfaces) of the corresponding substrates, respectively, and surfaces of the first substrate 301 and the second substrate 302 disposed opposite to the upper surfaces thereof are defined as lower surfaces (e.g., outer surfaces) of the corresponding substrates, respectively, the first polarizer may further be on the lower surface of the first substrate 301 and the second polarizer may further be on the lower surface of the second substrate 302.

A transmission axis of the first polarizer may be substantially perpendicular to a transmission axis of the second polarizer, such that one of the two transmission axes may be aligned in parallel to the gate line GL. In another exemplary embodiment, the LCD device may include only one of the first polarizer or the second polarizer.

The LCD device may further include a shielding electrode disposed on the capping layer 391 to overlap the data line DL. For example, the shielding electrode may have substantially the same shape as that of the first data line DL1 and may be disposed along the first data line DL1. The shielding electrode and the first sub-pixel electrode PE1 may be manufactured using substantially the same material. The common voltage Vcom may be applied to the shielding electrode. The shielding electrode may prevent an electric field being formed between the first data line DL1 and the sub-pixel electrode (e.g., the first, second, third, and fourth sub-pixel electrodes PE1, PE2, PE3, and PE4).

In addition, an equipotential is formed between the shielding electrode and the common electrode 330. Thus, light transmitted through the liquid crystal layer 333 between the shielding electrode and the common electrode 330 may be blocked by the second polarizer. Accordingly, light leakage in an area corresponding to the data line DL may be reduced or effectively prevented.

The first substrate 301 and the second substrate 302 may be an insulating substrate including glass, plastic, or the like.

In an exemplary embodiment, the liquid crystal layer 333 between the first substrate 301 and the second substrate 302 includes liquid crystal molecules. In such an exemplary embodiment, the liquid crystal molecules of the liquid crystal layer 333 may be, for example, homeotropic liquid crystal molecules having a negative dielectric constant.

As illustrated in FIG. 11A, in an exemplary embodiment, when an overlapping area between the first gate electrode GE1 and the first source electrode SE1 of the first switching element TFT1 is defined as a first overlapping area A1, and an overlapping area between the second gate electrode GE2 and the second source electrode SE2 of the second switching element TFT2 is defined as a second overlapping area A2, the first overlapping area A1 and the second overlapping area A2 are different from one another. In such an exemplary embodiment, the second overlapping area A2 is greater than the first overlapping area A1.

The first overlapping area A1 affects a capacitance value of the first parasitic capacitor Cgs1 between the first gate electrode GE1 and the first source electrode SE1. The second overlapping area A2 affects a capacitance value of the second parasitic capacitor Cgs2 between the second gate electrode GE2 and the second source electrode SE2. Accordingly, when the second overlapping area A2 is greater than the first overlapping area A1 and all the other conditions are the same, the capacitance value of the second parasitic capacitor Cgs2 is greater than the capacitance value of the first parasitic capacitor Cgs1.

As illustrated in FIG. 11B, in an exemplary embodiment, when an overlapping area between the third gate electrode GE3 and the third source electrode SE3 of the third switching element TFT3 is defined as a third overlapping area A3, and an overlapping area between the fourth gate electrode GE4 and the fourth source electrode SE4 of the fourth switching element TFT4 is defined as a fourth overlapping area A4, the third overlapping area A3 and the fourth overlapping area A4 are different from one another. In such an exemplary embodiment, the third overlapping area A3 is greater than the fourth overlapping area A4.

The third overlapping area A3 affects a capacitance value of the third parasitic capacitor Cgs3 between the third gate electrode GE3 and the third source electrode SE3. The fourth overlapping area A4 affects a capacitance value of the fourth parasitic capacitor Cgs4 between the fourth gate electrode GE4 and the fourth source electrode SE4. Accordingly, when the third overlapping area A3 is greater than the fourth overlapping area A4 and all the other conditions are the same, the capacitance value of the third parasitic capacitor Cgs3 is greater than the capacitance value of the fourth parasitic capacitor Cgs4.

Figure 12:
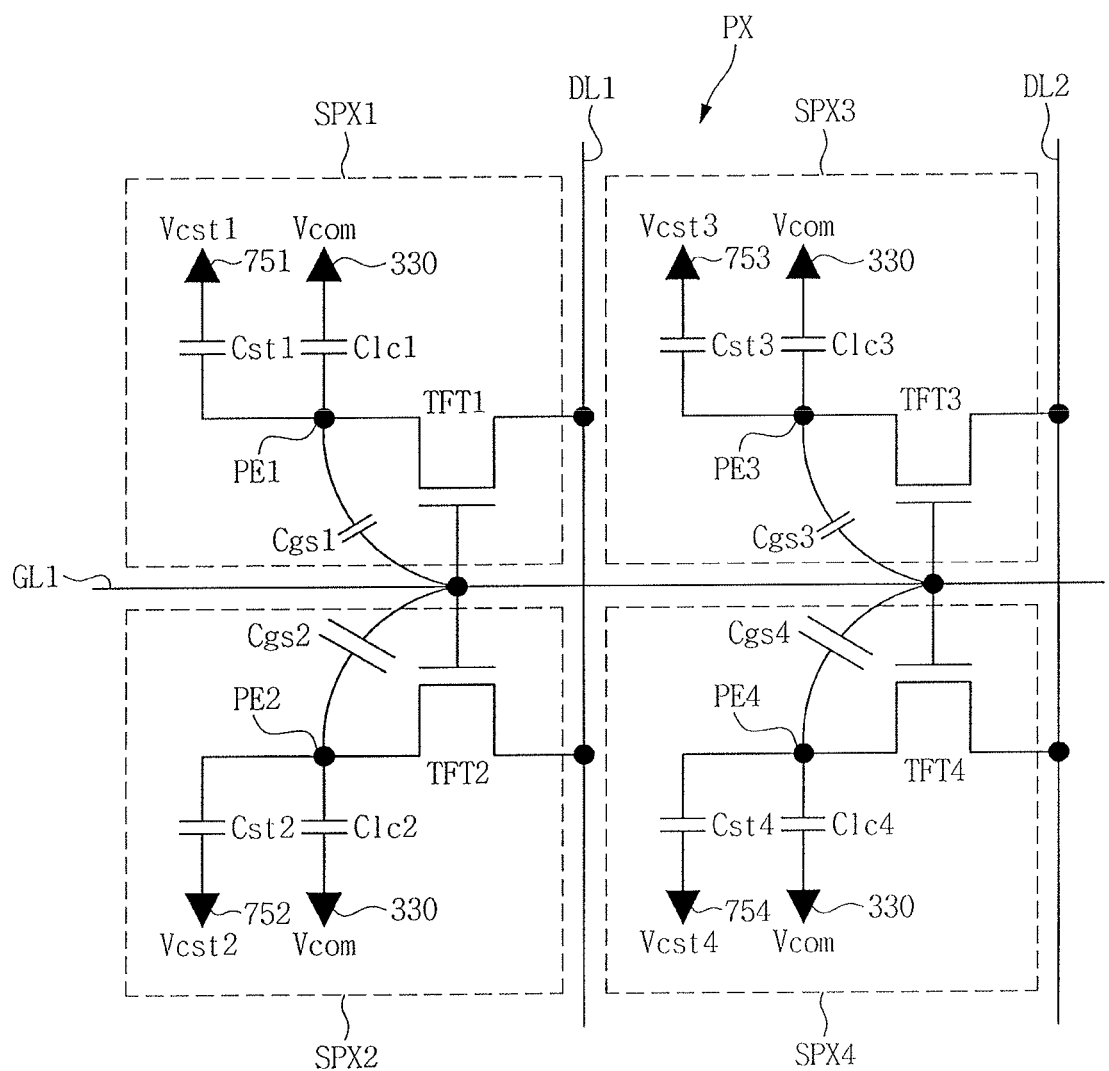
FIG. 12 illustrates another equivalent circuit diagram of a pixel.

FIG. 12 illustrates another embodiment of an equivalent circuit of a pixel PX. Referring to FIG. 12, pixel PX includes a first switching element TFT1, a second switching element TFT2, a third switching element TFT3, a fourth switching element TFT4, a first sub-pixel electrode PE1, a second sub-pixel electrode PE2, a third sub-pixel electrode PE3, a fourth sub-pixel electrode PE4, a first liquid crystal capacitor Clc1, a second liquid crystal capacitor Clc2, a third liquid crystal capacitor Clc3, a fourth liquid crystal capacitor Clc4, a first storage capacitor Cst1, a second storage capacitor Cst2, a third storage capacitor Cst3, a fourth storage capacitor Cst4, a first parasitic capacitor Cgs1, a second parasitic capacitor Cgs2, a third parasitic capacitor Cgs3, and a fourth parasitic capacitor Cgs4.

The first switching element TFT1, the second switching element TFT2, the first sub-pixel electrode PE1, the second sub-pixel electrode PE2, the third sub-pixel electrode PE3, the fourth sub-pixel electrode PE4, the first liquid crystal capacitor Clc1, the second liquid crystal capacitor Clc2, the third liquid crystal capacitor Clc3, the fourth liquid crystal capacitor Clc4, the first storage capacitor Cst1, the second storage capacitor Cst2, the third storage capacitor Cst3, the fourth storage capacitor Cst4, the first parasitic capacitor Cgs1, and the second parasitic capacitor Cgs2 in the pixel PX of FIG. 12 may be the same as those in the pixel PX of FIG. 3.

In an exemplary embodiment, the third switching element TFT3 of FIG. 12 is connected to a first gate line GL1, a second data line DL2, and the third sub-pixel electrode PE3. In such an exemplary embodiment, the third switching element TFT3 includes a gate electrode connected to the first gate line GL1, a drain electrode connected to the second data line DL2, and a source electrode connected to the third sub-pixel electrode PE3.

The third switching element TFT3 is turned on by a gate high voltage of a gate signal applied from the first gate line GL1. When turned on, the third switching element TFT3 applies a data voltage from the second data line DL2 to the third sub-pixel electrode PE3. The third switching element TFT3 is turned off by a gate low voltage of the gate signal.

In an exemplary embodiment, the fourth switching element TFT4 of FIG. 12 is connected to the first gate line GL1, the second data line DL2, and the fourth sub-pixel electrode PE4. In such an exemplary embodiment, the fourth switching element TFT4 includes a gate electrode connected to the first gate line GL1, a drain electrode connected to the second data line DL2, and a source electrode connected to the fourth sub-pixel electrode PE4.

The fourth switching element TFT4 is turned on by the gate high voltage of the gate signal from the first gate line GL1. When turned on, the fourth switching element TFT4 applies a data voltage from the second data line DL2 to the fourth sub-pixel electrode PE4. The fourth switching element TFT4 is turned off by the gate low voltage of the gate signal.

In FIG. 12, a parasitic capacitor having a relatively great capacitance value is illustrated as being relatively large and a parasitic capacitor having a relatively small capacitance value is illustrated as being relatively small to allow the capacitance values of the first, second, third, and fourth parasitic capacitors Cgs1, Cgs2, Cgs3, and Cgs4 to be readily compared. As illustrated in FIG. 12, in an exemplary embodiment, the capacitance value of the second parasitic capacitor Cgs2 is greater than the capacitance value of the first parasitic capacitor Cgs1, and the capacitance value of the fourth parasitic capacitor Cgs4 is greater than the capacitance value of the third parasitic capacitor Cgs3.

In FIG. 12, a polarity of the data voltage applied to the first data line DL1 is different from a polarity of the data voltage applied to the second data line DL2. For example, when the data voltage applied to the first data line DL1 is maintained positive during one frame period, the data voltage applied to the second data line DL2 is maintained negative during the one frame period.

Figure 13:
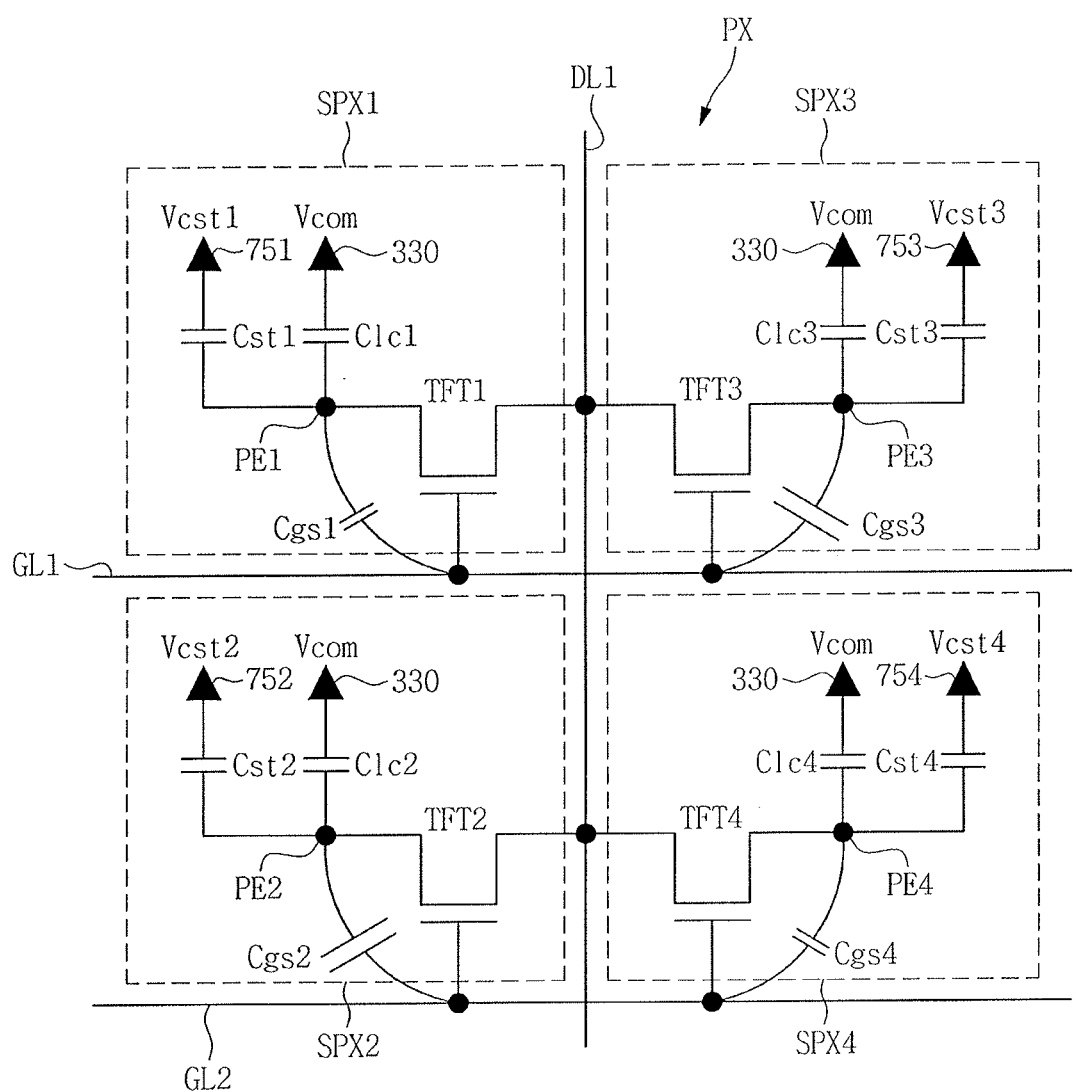
FIG. 13 illustrates still another equivalent circuit diagram of a pixel.

FIG. 13 illustrates another embodiment of an equivalent circuit of a pixel PX. Referring to FIG. 13, a pixel PX includes a first switching element TFT1, a second switching element TFT2, a third switching element TFT3, a fourth switching element TFT4, a first sub-pixel electrode PE1, a second sub-pixel electrode PE2, a third sub-pixel electrode PE3, a fourth sub-pixel electrode PE4, a first liquid crystal capacitor Clc1, a second liquid crystal capacitor Clc2, a third liquid crystal capacitor Clc3, a fourth liquid crystal capacitor Clc4, a first storage capacitor Cst1, a second storage capacitor Cst2, a third storage capacitor Cst3, a fourth storage capacitor Cst4, a first parasitic capacitor Cgs1, a second parasitic capacitor Cgs2, a third parasitic capacitor Cgs3, and a fourth parasitic capacitor Cgs4.

The first switching element TFT1, the third switching element TFT3, the first sub-pixel electrode PE1, the second sub-pixel electrode PE2, the third sub-pixel electrode PE3, the fourth sub-pixel electrode PE4, the first liquid crystal capacitor Clc1, the second liquid crystal capacitor Clc2, the third liquid crystal capacitor Clc3, the fourth liquid crystal capacitor Clc4, the first storage capacitor Cst1, the second storage capacitor Cst2, the third storage capacitor Cst3, the fourth storage capacitor Cst4, the first parasitic capacitor Cgs1, the second parasitic capacitor Cgs2, the third parasitic capacitor Cgs3, and the fourth parasitic capacitor Cgs4 in the pixel PX of FIG. 13 may be the same as those in the pixel PX of FIG. 3.

In an exemplary embodiment, the second switching element TFT2 of FIG. 13 is connected to a second gate line GL2, a first data line DL1, and the second sub-pixel electrode PE2. In such an exemplary embodiment, the second switching element TFT2 includes a gate electrode connected to the second gate line GL2, a drain electrode connected to the first data line DL1, and a source electrode connected to the second sub-pixel electrode PE2.

The second switching element TFT2 is turned on by a gate high voltage of a gate signal from the second gate line GL2. When turned on, the second switching element TFT2 applies a data voltage from the first data line DL1 to the second sub-pixel electrode PE2. The second switching element TFT2 is turned off by a gate low voltage of the gate signal.

In an exemplary embodiment, the fourth switching element TFT4 of FIG. 13 is connected to the second gate line GL2, the first data line DL1, and the fourth sub-pixel electrode PE4. In such an exemplary embodiment, the fourth switching element TFT4 includes a gate electrode connected to the second gate line GL2, a drain electrode connected to the first data line DL1, and a source electrode connected to the fourth sub-pixel electrode PE4.

The fourth switching element TFT4 is turned on by the gate high voltage of the gate signal from the second gate line GL2. When turned on, the fourth switching element TFT4 applies the data voltage from the first data line DL1 to the fourth sub-pixel electrode PE4. The fourth switching element TFT4 is turned off by the gate low voltage of the gate signal.

In FIG. 13, a parasitic capacitor having a relatively great capacitance value is illustrated as being relatively large and a parasitic capacitor having a relatively small capacitance value is illustrated as being relatively small to allow capacitance values of the first, second, third, and fourth parasitic capacitors Cgs1, Cgs2, Cgs3, and Cgs4 to be readily compared. As illustrated in FIG. 13, in an exemplary embodiment, the capacitance value of the second parasitic capacitor Cgs2 is greater than the capacitance value of the first parasitic capacitor Cgs1, and the capacitance value of the third parasitic capacitor Cgs3 is greater than the capacitance value of fourth parasitic capacitor Cgs4.

In an exemplary embodiment, the capacitance value of the third parasitic capacitor Cgs3 in the pixel PX of FIG. 13 is the same as a capacitance value of a first parasitic capacitor Cgs1 in another pixel. The capacitance value of the fourth parasitic capacitor Cgs4 in the pixel PX of FIG. 13 may be the same as a capacitance value of a second parasitic capacitor Cgs2 in the other pixel. In such an exemplary embodiment, the another pixel corresponds to the pixel PX connected to the first gate line GL1, the second gate line GL2, and the second data line DL2. As illustrated in FIG. 5, a pixel connected to an odd-numbered data line and a pixel connected to an even-numbered data line may have different structures from one another.

In accordance with one or more of the aforementioned embodiments, levels of data signals applied to respective sub-pixel electrodes may be controlled through the use of a parasitic capacitor without a voltage divider transistor. Accordingly, the aperture ratio of the pixel may increase. In addition, as the level of the data signal is controlled based on a capacitance value of the parasitic capacitor rather than an internal resistance value of a transistor, the level of the data signal may be controlled relatively easily.

In such exemplary embodiments, due to the absence of a voltage divider transistor, a data line and a storage electrode may not be directly connected to one another. Accordingly, variation in the level of a storage voltage may be significantly reduced.

In such exemplary embodiments, ripples of a common voltage may be significantly reduced due to data voltages that have substantially the same magnitude and that transition in opposite directions. Accordingly, horizontal crosstalk may be significantly reduced. In such exemplary embodiments, the number of the gate lines and the data lines may be reduced.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the embodiments in the claims.

What is claimed is:

1. A liquid crystal display device, comprising:
a substrate;
a gate line, a first data line and a second data line on the substrate;
a first sub-pixel electrode on a first sub-pixel area of the substrate;
a second sub-pixel electrode on a second sub-pixel area of the substrate;
a third sub-pixel electrode on a third sub-pixel area of the substrate;
a fourth sub-pixel electrode on a fourth sub-pixel area of the substrate;
a first switch connected to the gate line, the first data line and the first sub-pixel electrode;
a second switch connected to the gate line, the first data line and the second sub-pixel electrode;
a third switch connected to the gate line, the second data line and the third sub-pixel electrode;
a fourth switch connected to the gate line, the second data line and the fourth sub-pixel electrode;
a first capacitor connected between a first gate electrode of the first switch and a first source electrode of the first switch, the first source electrode being connected to the first sub-pixel electrode;
a second capacitor connected between a second gate electrode of the second switch and a second source electrode of the second switch, the second source electrode being connected to the second sub-pixel electrode;
a third capacitor connected between a third gate electrode of the third switch and a third source electrode of the third switch; and
a fourth capacitor connected between a fourth gate electrode of the fourth switch and a fourth source electrode of the fourth switch,
wherein at least two of the first, second, third and fourth capacitors have different capacitance values from one another, and in which the first capacitor and the second capacitor have different capacitance values from one another.

2. The device as claimed in claim 1, wherein:
the first to fourth gate electrodes are connected to the gate line,
the third source electrode is connected to the third sub-pixel electrode, and
the fourth source electrode is connected to the fourth sub-pixel electrode.

3. The device as claimed in claim 1, wherein:
the third capacitor and the fourth capacitor have different capacitance values from one another.

4. The device as claimed in claim 3, wherein:
the first capacitor and the third capacitor have a same capacitance value as one another, and
the second capacitor and the fourth capacitor have a same capacitance value as one another.

5. The device as claimed in claim 3, wherein:
the capacitance value of the second capacitor is greater than the capacitance value of the first capacitor, and
the capacitance value of the fourth capacitor is greater than the capacitance value of the third capacitor.

6. The device as claimed in claim 1, wherein:
a first overlapping area between the first gate electrode and the first source electrode is different from a second overlapping area between the second gate electrode and the second source electrode.

7. The device as claimed in claim 6, wherein:
the second overlapping area is greater than the first overlapping area.

8. The device as claimed in claim 1, wherein:
a third overlapping area between the third gate electrode and the third source electrode is different from a fourth overlapping area between the fourth gate electrode and the fourth source electrode.

9. The device as claimed in claim 8, wherein:
the fourth overlapping area is greater than the third overlapping area.

10. The device as claimed in claim 1, wherein:
a data voltage of the first data line and a data voltage of second data line have opposite polarities to one another.

11. The device as claimed in claim 1, wherein:
the first switch is directly connected to the gate line and the first data line,
the second switch is directly connected to the gate line and the first data line,
the third switch is directly connected to the gate line and the second data line, and the fourth switch is directly connected to the gate line and the second data line.

12. The device as claimed in claim 1, further comprising:
a first color filter on the first sub-pixel area;
a second color filter on the second sub-pixel area;
a third color filter on the third sub-pixel area; and
a fourth color filter on the fourth sub-pixel area.

13. The device as claimed in claim 12, wherein:
the first to fourth color filters have the same color.

\* \* \* \* \*